United States Patent
Clark

(10) Patent No.: US 8,502,696 B2
(45) Date of Patent: Aug. 6, 2013

(54) DUAL WELLBORE TELEMETRY SYSTEM AND METHOD

(75) Inventor: Brian Clark, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 801 days.

(21) Appl. No.: 12/496,885

(22) Filed: Jul. 2, 2009

(65) Prior Publication Data

US 2010/0171638 A1    Jul. 8, 2010

Related U.S. Application Data

(63) Continuation of application No. 11/614,444, filed on Dec. 21, 2006, now Pat. No. 8,004,421, which is a continuation-in-part of application No. 11/382,598, filed on May 10, 2006, now abandoned.

(51) Int. Cl.
*G01V 3/00* (2006.01)

(52) U.S. Cl.
USPC ......... 340/853.1; 340/854.4; 367/82; 175/40; 175/50

(58) Field of Classification Search
USPC ................. 340/853.1, 854.4; 367/82; 175/40, 175/50
See application file for complete search history.

(56) References Cited

U.S. PATENT DOCUMENTS

| | | | |
|---|---|---|---|
| 2,352,833 A | 7/1944 | Hassler | |
| 2,700,131 A | 1/1955 | Otis et al. | |
| 3,065,416 A | 11/1962 | Jeter | |
| 3,309,656 A | 3/1967 | Godbey | |
| 3,713,089 A | 1/1973 | Clacomb | |
| 3,764,970 A | 10/1973 | Manning | |
| 4,057,781 A | 11/1977 | Scherbatskoy | |
| RE29,734 E | 8/1978 | Manning | |
| 4,262,343 A | 4/1981 | Claycomb | |
| 4,320,470 A | 3/1982 | Angehrn | |
| 4,329,734 A | 5/1982 | Latos | |
| 4,402,068 A | 8/1983 | Angehrn | |
| 4,535,429 A | 8/1985 | Russell et al. | |
| 4,715,022 A | 12/1987 | Yeo | |
| 4,725,837 A | 2/1988 | Rubin | |

(Continued)

FOREIGN PATENT DOCUMENTS

| | | |
|---|---|---|
| EP | 78906 | 5/1983 |
| GB | 1316617 | 5/1973 |

(Continued)

OTHER PUBLICATIONS

N Toksov and R Stewart, Vertical Seismic Profiling, v. 14b, pp. 288-301, Geophysical Press, London (1984).

(Continued)

*Primary Examiner* — Albert Wong
(74) *Attorney, Agent, or Firm* — Chadwick A. Sullivan

(57) ABSTRACT

A method of signal processing includes providing at least a first pressure sensor and a second pressure sensor spaced in a drilling system and using an algorithm to separate the downwardly propagating waves from the upwardly propagating waves. In one or more examples, an algorithm may include determining a velocity of pressure signals in a wellbore, time-shifting and stacking pressure signals from at least the first pressure sensor and the second pressure sensor to determine a downwardly propagating noise signal, and subtracting the downwardly propagating noise signal from at least the signal from the first pressure sensor.

3 Claims, 11 Drawing Sheets

U.S. PATENT DOCUMENTS

| | | | |
|---|---|---|---|
| 4,771,406 A | 9/1988 | Oishi et al. | |
| 4,771,408 A | 9/1988 | Kotlyar | |
| 4,847,815 A | 7/1989 | Malone | |
| 4,945,761 A | 8/1990 | Lessi et al. | |
| 4,979,112 A | 12/1990 | Ketcham | |
| 5,125,152 A | 6/1992 | Grasmueller et al. | |
| 5,128,901 A | 7/1992 | Drumheller | |
| 5,146,433 A | 9/1992 | Kosmala et al. | |
| 5,160,925 A * | 11/1992 | Dailey et al. | 340/853.3 |
| 5,182,730 A | 1/1993 | Scherbatskoy | |
| 5,215,152 A | 6/1993 | Duckworth | |
| 5,237,540 A | 8/1993 | Malone | |
| 5,249,161 A | 9/1993 | Jones | |
| 5,274,060 A | 12/1993 | Schadeli | |
| 5,274,606 A | 12/1993 | Drumheller et al. | |
| 5,375,098 A | 12/1994 | Malone et al. | |
| 5,396,232 A | 3/1995 | Mathieu et al. | |
| 5,448,227 A | 9/1995 | Orban et al. | |
| 5,517,464 A | 5/1996 | Lerner et al. | |
| 5,583,827 A | 12/1996 | Chin | |
| 5,586,084 A | 12/1996 | Barron et al. | |
| 5,624,051 A | 4/1997 | Ahern, Jr. et al. | |
| 5,774,420 A | 6/1998 | Heysse et al. | |
| 5,886,303 A | 3/1999 | Rodney | |
| 6,078,868 A | 6/2000 | Dubinsky | |
| 6,219,301 B1 | 4/2001 | Moriarty | |
| 6,262,343 B1 | 7/2001 | Staskawicz et al. | |
| 6,396,276 B1 | 5/2002 | Van Steenwyk et al. | |
| 6,421,298 B1 | 7/2002 | Beattie et al. | |
| 6,626,253 B2 | 9/2003 | Hahn et al. | |
| 6,641,434 B2 | 11/2003 | Boyle et al. | |
| 6,741,185 B2 | 5/2004 | Shi et al. | |
| 6,788,219 B2 | 9/2004 | Sun et al. | |
| 6,866,306 B2 | 3/2005 | Boyle et al. | |
| 6,898,150 B2 | 5/2005 | Hahn et al. | |
| 6,909,667 B2 | 6/2005 | Shah et al. | |
| 7,040,415 B2 * | 5/2006 | Boyle et al. | 175/40 |
| 7,163,065 B2 | 1/2007 | Zhang et al. | |
| 7,228,908 B2 | 6/2007 | East, Jr. et al. | |
| 7,397,388 B2 | 7/2008 | Huang et al. | |
| 7,573,397 B2 | 8/2009 | Petrovic et al. | |
| 7,894,302 B2 * | 2/2011 | Aiello et al. | 367/83 |
| 8,164,476 B2 * | 4/2012 | Hache et al. | 340/854.4 |
| 2002/0075114 A1 | 6/2002 | Hall et al. | 336/192 |
| 2002/0163334 A1 | 11/2002 | Hagiwara | |
| 2003/0151522 A1 | 8/2003 | Jeffryes et al. | |
| 2003/0151977 A1 * | 8/2003 | Shah et al. | 367/82 |
| 2003/0151978 A1 | 8/2003 | Jeffryes et al. | |
| 2004/0124994 A1 | 7/2004 | Oppelt | |
| 2004/0149471 A1 * | 8/2004 | Hall et al. | 174/21 R |
| 2004/0150532 A1 * | 8/2004 | Hall et al. | 340/854.3 |
| 2004/0163822 A1 * | 8/2004 | Zhang et al. | 166/380 |
| 2005/0000733 A1 | 1/2005 | Schaaf | |
| 2005/0001738 A1 * | 1/2005 | Hall et al. | 340/854.8 |
| 2005/0012637 A1 | 1/2005 | Golla et al. | |
| 2005/0024231 A1 | 2/2005 | Fincher et al. | |
| 2005/0024232 A1 | 2/2005 | Gardner et al. | |
| 2005/0087368 A1 * | 4/2005 | Boyle et al. | 175/57 |
| 2005/0087388 A1 | 4/2005 | Turner et al. | |
| 2005/0092499 A1 * | 5/2005 | Hall et al. | 166/380 |
| 2005/0109538 A1 | 5/2005 | Fisseler et al. | |
| 2005/0167088 A1 | 8/2005 | Paulman | |
| 2005/0260089 A1 | 11/2005 | Hahn et al. | |
| 2005/0284659 A1 | 12/2005 | Hall et al. | |
| 2006/0214814 A1 | 9/2006 | Pringnitz et al. | |
| 2007/0045006 A1 | 3/2007 | Krueger et al. | |
| 2007/0062692 A1 | 3/2007 | Estevez et al. | |
| 2007/0247328 A1 | 10/2007 | Petrovic et al. | |
| 2008/0037369 A1 | 2/2008 | Hentati | |
| 2010/0201540 A1 | 8/2010 | Li et al. | |

FOREIGN PATENT DOCUMENTS

| | | |
|---|---|---|
| GB | 2121572 | 12/1983 |
| GB | 2147722 | 5/1985 |
| GB | 2361789 | 10/2001 |
| GB | 2372521 | 8/2002 |
| GB | 2006099362 | 9/2006 |
| GB | 2428054 | 1/2007 |
| GB | 2449004 | 11/2008 |
| WO | 01/46548 | 6/2001 |
| WO | 2004085796 | 10/2004 |

OTHER PUBLICATIONS

Hardage, Vertical Seismic Profiling, v. 14a, pp. 147-220, Geophysical Press (London 1985).

R. Hutin, et al, "New Mud Pulse Telemetry Techniques for Deepwater Applications and Improved Real-Time Data Capabilities," SPE IADC 67762, 2001.

N. Tokov and R. Stewart, "Vertical Seismic Profiling," V14B, pp. 288-301, Geophysical Press, London (1984).

Hardage, "Vertical Seismic Profiling," V. 14A pp. 147-220, Geophysical. Press (London 1985).

* cited by examiner

DUAL WELLBORE TELEMETRY SYSTEM AND METHOD

RELATED APPLICATION

This application is a continuation of U.S. patent application Ser. No. 11/614,444, filed on Oct. 25, 2007, which is a continuation-in-part of U.S. patent application Ser. No. 11/382,598, filed on May 10, 2006.

FIELD OF THE DISCLOSURE

The present disclosure relates to telemetry systems and methods for use in wellbore operations. More particularly, the present disclosure relates to noise cancellation systems and methods for use with wellbore telemetry systems.

BACKGROUND

Wellbores may be drilled to locate and produce hydrocarbons. Typically, a wellbore is formed by advancing a downhole drilling tool having a drill bit at one end into the ground. As the drilling tool is advanced, drilling mud is pumped from a surface mud pit through a passage or passages in the drilling tool and out the drill bit. The mud exiting the drill bit flows back to the surface to be returned to the mud pit and may be re-circulated through the drilling tool. In this manner, the drilling mud cools the drilling tool, carries cuttings and other debris away from the drilling tool, and deposits the cuttings and other debris in the mud pit. As is known, in addition to the cooling and cleaning operations performed by the mud pumped into the wellbore, the mud forms a mudcake that lines the wellbore which, among other functions, reduces friction between the drill string and subterranean formations.

During drilling operations (i.e., advancement of the downhole drilling tool), communications between the downhole drilling tool and a surface-based processing unit and/or other surface devices may be performed using a telemetry system. In general, such telemetry systems enable the conveyance of power, data, commands, and/or any other signals or information between the downhole drilling tool and the surface devices. Thus, the telemetry systems enable, for example, data related to the conditions of the wellbore and/or the downhole drilling tool to be conveyed to the surface devices for further processing, display, etc. and also enable the operations of the downhole drilling tool to be controlled via commands and/or other information sent from the surface device(s) to the downhole drilling tool.

One known wellbore telemetry system 100 is depicted in FIG. 1. A more detailed description of such a known system is found in U.S. Pat. No. 5,517,464, which is incorporated by reference herein in its entirety. With reference to FIG. 1, a drilling rig 10 includes a drive mechanism 12 to provide a driving torque to a drill string 14. The lower end of the drill string 14 extends into a wellbore 30 and carries a drill bit 16 to drill an underground formation 18. During drilling operations, drilling mud 20 is drawn from a mud pit 22 on a surface 29 via one or more pumps 24 (e.g., reciprocating pumps). The drilling mud 20 is circulated through a mud line 26 down through the drill string 14, through the drill bit 16, and back to the surface 29 via an annulus 28 between the drill string 14 and the wall of the wellbore 30. Upon reaching the surface 29, the drilling mud 20 is discharged through a line 32 into the mud pit 22 so that rock and/or other well debris carried in the mud can settle to the bottom of the mud pit 22 before the drilling mud 20 is recirculated.

As shown in FIG. 1, a downhole measurement while drilling (MWD) tool 34 is incorporated in the drill string 14 near the drill bit 16 for the acquisition and transmission of downhole data or information. The MWD tool 34 includes an electronic sensor package 36 and a mud pulse or mudflow wellbore telemetry device 38. The mudflow telemetry device 38 can selectively block or partially block the passage of the mud 20 through the drill string 14 to cause pressure changes in the mud line 26. In other words, the wellbore telemetry device 38 can be used to modulate the pressure in the mud 20 to transmit data from the sensor package 36 to the surface 29. Modulated changes in pressure are detected by a pressure transducer 40 and a pump piston sensor 42, both of which are coupled to a processor (not shown). The processor interprets the modulated changes in pressure to reconstruct the data collected and sent by the sensor package 36. The modulation and demodulation of a pressure wave are described in detail in commonly assigned U.S. Pat. No. 5,375,098, which is incorporated by reference herein in its entirety.

In addition to the known mud pulse telemetry system 100 depicted in FIG. 1, other wellbore telemetry systems may be used to establish communication between a downhole tool and a surface unit. Examples of known telemetry systems include a wired drill pipe wellbore telemetry system as described in U.S. Pat. No. 6,641,434, an electromagnetic wellbore telemetry system as described in U.S. Pat. No. 5,624,051, an acoustic wellbore telemetry system as described in published PCT Patent Application No. WO2004085796, all of which are hereby incorporated by reference herein in their entireties. Further examples using data conveyance or communication devices (e.g., transceivers coupled to transducers or sensors) have also been used to convey power and/or data between a downhole tool and a surface unit.

Despite the development and advancement of wellbore telemetry devices in wellbore operations, there remains a need for additional reliability and wellbore telemetry capabilities for wellbore operations. As with other many other wellbore devices, wellbore telemetry devices sometimes fail. Additionally, the power provided by many known wellbore telemetry devices may be insufficient to power desired wellbore operations. Attempts have been made to use two different types of mud pulse telemetry devices in a downhole tool. In particular, each of the different mud pulse telemetry devices is typically positioned in the downhole tool and communicatively linked to a different, respective surface unit. Such wellbore telemetry tools have been run simultaneously and non-simultaneously and at different frequencies. Attempts have also been made to develop dual channel downhole wellbore telemetry for transmitting data streams via communication channels to be interpreted independently as described in U.S. Pat. No. 6,909,667.

SUMMARY

In accordance with one disclosed example, a method of signal processing that includes providing at least a first pressure sensor and a second pressure sensor spaced in a drilling system and using an algorithm to separate the downwardly propagating waves from the upwardly propagating waves. In one or more examples, an algorithm may include determining a velocity of pressure signals in a wellbore, time-shifting and stacking pressure signals from at least the first pressure sensor and the second pressure sensor to determine a downwardly propagating noise signal, and subtracting the downwardly propagating noise signal from at least the signal from the first pressure sensor.

In accordance with another disclosed example, a wellbore communication system that includes a plurality of pressure sensors spaced within a drilling system along a drilling fluid flow path and communicatively coupled to a surface system and a mud pulse telemetry system positioned within a downhole tool.

In accordance with another disclosed example, a method for wellbore communications that includes obtaining a first corrected pressure signal and a downwardly propagating noise signal from at least a first pressure sensor, computing a cross-correlation function between the first corrected pressure signal and the downwardly propagating noise signal for at least the first pressure sensor, computing the standard deviation of the downwardly propagating noise signal, computing a reflection coefficient for the downwardly propagating noise signal, computing the reflected, upwardly propagating noise signal, and subtracting the upwardly propagating noise signal from the first corrected pressure signal.

DETAILED DESCRIPTION

Despite advancements in wellbore telemetry systems, there remains a need to provide wellbore telemetry systems capable of providing added reliability, increased speed or bandwidth, and increased power capabilities. As set forth in the detailed description below, one or more example methods and apparatus may enable telemetry systems to operate at one or more desired frequencies and provide increased bandwidth. Additionally, one or more example methods and apparatus described below may enable a plurality of different wellbore telemetry devices to be combined with a variety of one or more downhole components, such as formation evaluation tools, to provide flexibility in performing wellbore operations. Still further, one or more example methods and apparatus described below may provide backup wellbore telemetry capability, enable the operation of multiple identical or substantially similar wellbore telemetry tools, enable the generation of comparative wellbore measurements, enable the activation of multiple wellbore telemetry tools, increase the available bandwidth and/or data transmission rates for communications between one or more downhole tools and one or more surface units, and enable adaptation of the wellbore telemetry tools to different and/or varying wellbore conditions.

One or more example methods and apparatus described below may also utilize drill string telemetry systems and methods that enable the signal-to-noise ratios associated with measurement while drilling signals to be increased. In particular, as described in detail below, one or more pressure sensors or transducers (e.g., an array of pressure transducers) may be disposed (e.g., spaced apart based on a wavelength of a MWD signal) in a portion of a drill string that is composed of wired drill pipe. Pressure signal data collected via the pressure transducers may then be used in conjunction with one or more signal processing techniques to separate, suppress and/or cancel downwardly propagating rig noise (e.g., mud pump generated noise) from upwardly propagating MWD signals (e.g., from a MWD pulser), thereby increasing the signal-to-noise ratio of the MWD signals. In addition, upwardly propagating noise that results from the reflection of downwardly propagating noise can also be separated and removed from the MWD signals.

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

Figure 1:
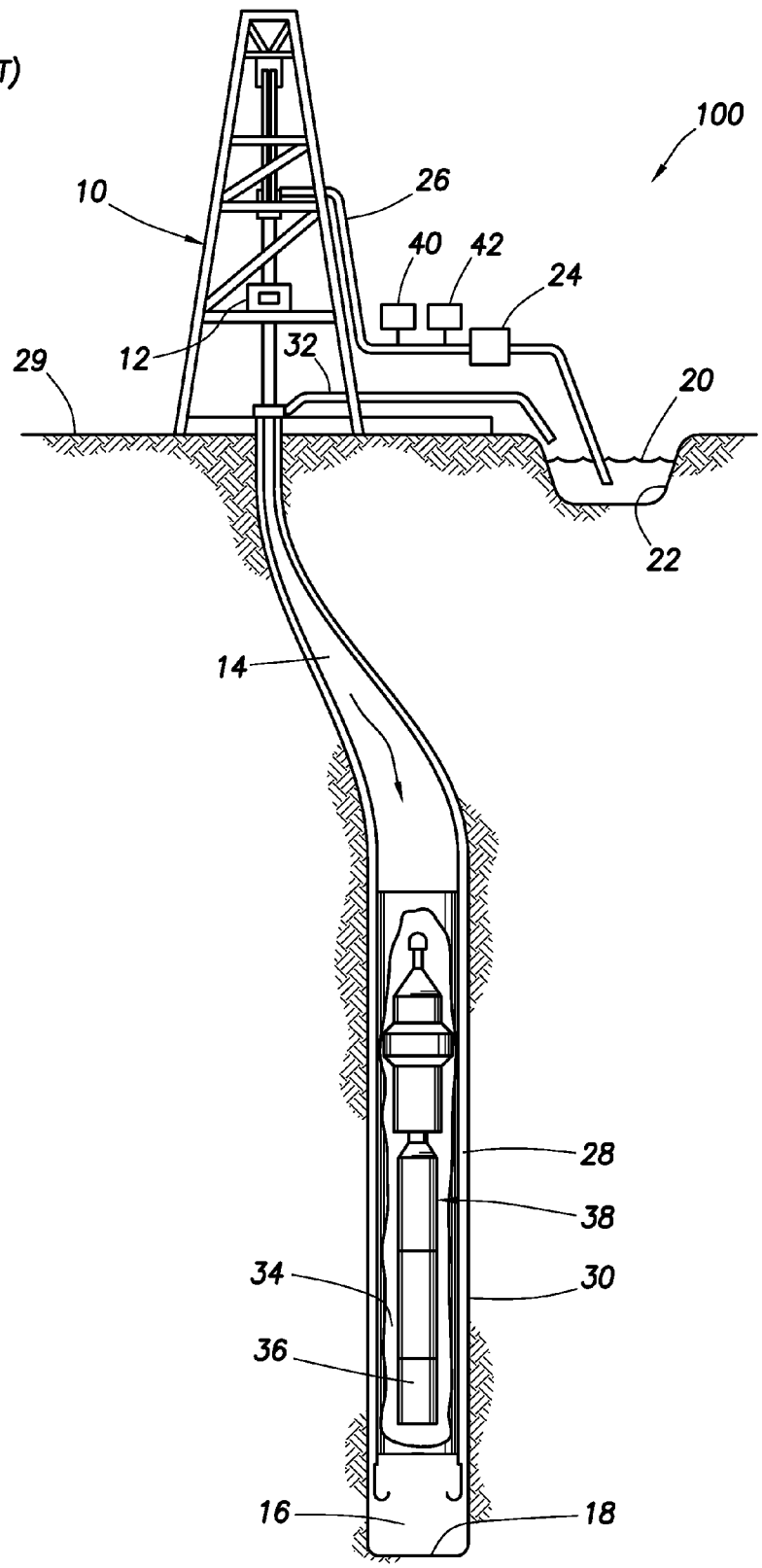
FIG. 1 is a schematic view, partially in cross-section, of a known measurement while drilling tool and wellbore telemetry device connected to a drill string and deployed from a rig into a wellbore.
Figure 2:
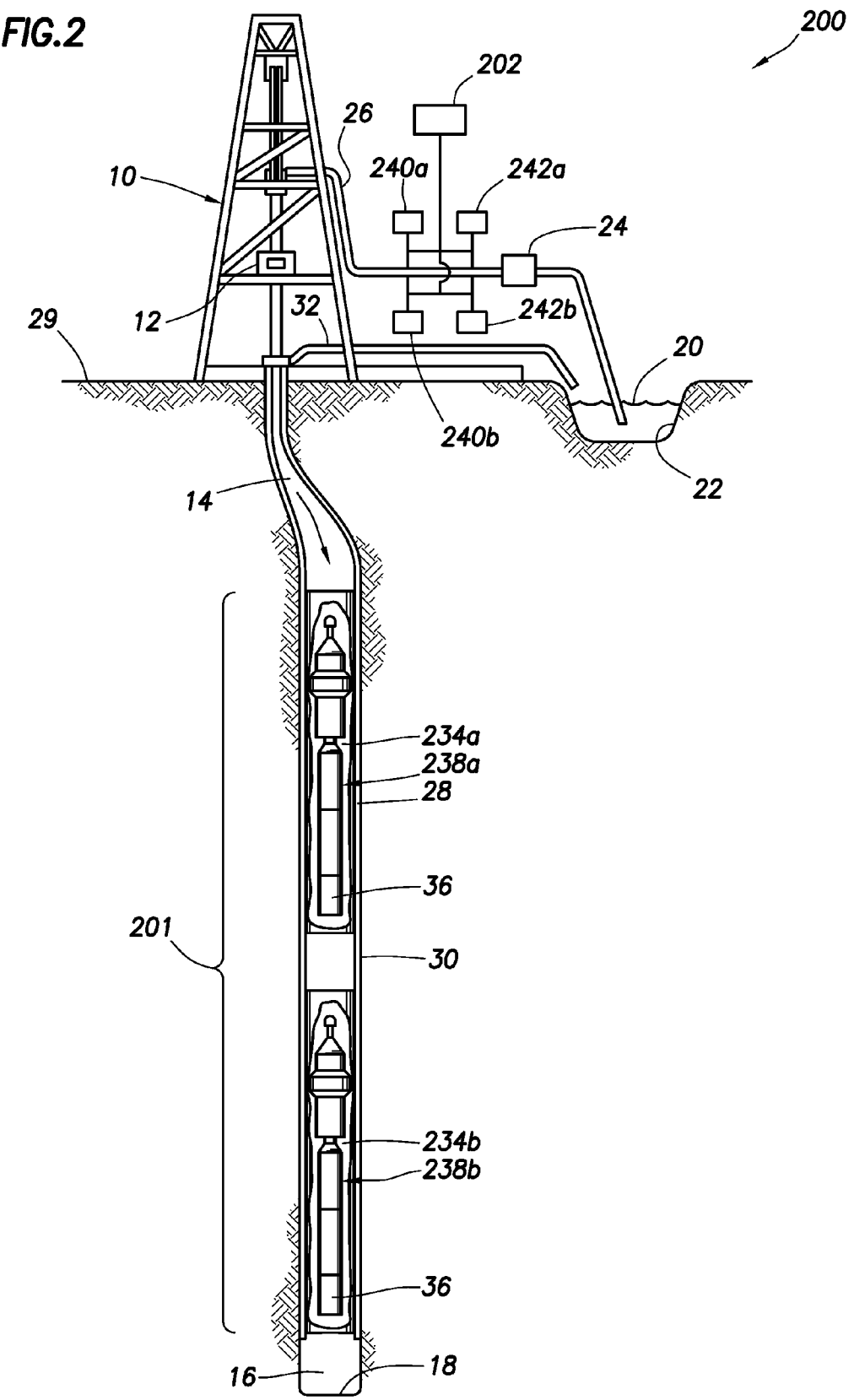
FIG. 2 is a schematic view, partially in cross-section, of an example telemetry system including a downhole tool having multiple mud pulse telemetry devices.

Referring now to FIG. 2, a mud pulse wellbore telemetry system 200 having multiple telemetry devices is shown. In contrast to the known system 100 of FIG. 1, the example wellbore telemetry system 200 includes two MWD tools 234a and 234b, two mud pulse telemetry devices 238a and 238b, two transducers 240a and 240b, and two sensors 242a and 242b. Additionally, the MWD tools 234a and 234b may communicate with a single surface computer or unit 202 via the mud pulse telemetry devices 238a and 238b. As can be seen in the example system 200 of FIG. 2, the mud pulse telemetry devices 238a and 238b are identical or substantially identical, the MWD tools 234a and 234b are identical or substantially identical, and the devices 238a and 238b and the tools 234a and 234b are positioned within a single downhole tool 201 (i.e., the same downhole tool).

The surface unit or computer 202 may be implemented using any desired combination of hardware and/or software. For example, a personal computer platform, workstation platform, etc. may store on a computer readable medium (e.g., a magnetic or optical hard disk, random access memory, etc.) and execute one or more software routines, programs, machine readable code or instructions, etc. to perform the operations described herein. Additionally or alternatively, the surface unit or computer 202 may use dedicated hardware or logic such as, for example, application specific integrated circuits, configured programmable logic controllers, discrete logic, analog circuitry, passive electrical components, etc. to perform the functions or operations described herein.

Still further, while the surface unit 202 is depicted in the example of FIG. 2 as being relatively proximate to the drilling rig 10, some part of or the entire surface unit 202 may alternatively be located relatively remotely from the rig 10. For example, the surface unit 202 may be operationally and/or communicatively coupled to the wellbore telemetry system 200 via any combination of one or more wireless or hardwired communication links (not shown). Such communication links may include communications via a packet switched network (e.g., the Internet), hardwired telephone lines, cellular communication links and/or other radio frequency based communication links, etc. using any desired communication protocol.

Returning in detail to FIG. 2, the MWD tools 234a and 234b may be implemented using the same device(s) used to implement the MWD tool 34 of FIG. 1. Similarly, the mud pulse telemetry devices 238a and 238b may be implemented using the same device(s) used to implement the mud pulse telemetry device 38 of FIG. 1. An example of a mud pulse telemetry device that may be used or otherwise adapted to implement the devices 38, 238a, and 238b is described in U.S. Pat. No. 5,517,464, which has previously been incorporated by reference.

In operation, the example wellbore telemetry system 200 of FIG. 2 uses the mud pulse telemetry devices 238a and 238b to generate signals (e.g., modulated pressure signals) in the mud 20 flowing in the annulus 28 of the wellbore 30. These generated signals (e.g., modulated or varying pressure signals) may be sensed by one or more of the pressure transducers 240a and 240b and/or the pressure sensors 242a and 242b and analyzed by the surface unit 202 to extract or otherwise obtain data or other information relating to the operational condition(s) of the downhole tool 201 (e.g., one or both of the MWD tools 234a and 234b), conditions in wellbore 30, and/or any other desired downhole information. In this manner, communications may be established between the downhole tool 201 and, thus, between the MWD tools 234a and 234b, and the surface unit 202. More generally, such communications between the downhole tool 201 and the surface unit 202 may be established using uplink and/or downlink systems. Further, while mud pulse telemetry devices 238a and 238b are described in connection with the example telemetry system 200 of FIG. 2, other types of wellbore telemetry devices may be employed instead of or in addition to the mud pulse telemetry devices 238a and 238b. For example, one or more mud sirens, positive pulse mud flow telemetry devices, and/or negative pulse mud flow telemetry devices may be used.

In general, the example wellbore telemetry systems described herein may use telemetry devices arranged or positioned in various configurations relative to the downhole tool. In the example of FIG. 2, one or both of the telemetry devices 238a and 238b may be operatively or communicatively coupled to the same (i.e., a single) MWD tool (e.g., the tool 234a or the tool 234b). Alternatively, each of the telemetry devices 238a and 238b may be operatively or communicatively coupled to different respective tools. For example, the telemetry device 238a may be communicatively or operatively coupled to the MWD tool 234a and the telemetry device 238b may be communicatively or operatively coupled to the MWD tool 234b, as depicted in FIG. 2. As described in greater detail below, one or both of the telemetry devices 238a and 238b may be communicatively or operatively coupled to one or more additional downhole components.

Turning again to the operation of the example system 200 of FIG. 2, the mud pulse telemetry devices 238a and 238b may send uplink signals (e.g., varying or modulated pressure signals to be conveyed up along through the drill string 14 to the surface 29) by altering the flow of mud through the telemetry devices 238a and 238b. Such uplink signals (e.g., varying or modulated pressure signals) are sensed or detected by the pressure transducers 240a and 240b and/or the pressure sensors 242a and 242b. In particular, the uplink signals generated by the telemetry device 238a may be detected or sensed by the transducer 240a and/or the pressure sensor 242a. Similarly, the uplink signals generated by the telemetry device 238b may be detected or sensed by the transducer 240b and/or the pressure sensor 242b. The pressure transducers 240a and 240b may be implemented using devices identical or similar to that used to implement the pressure transducer 40 of FIG. 1, and the sensors 242a and 242b may be implemented using devices identical or similar to that used to implement the sensor 42 of FIG. 1.

Figure 3:
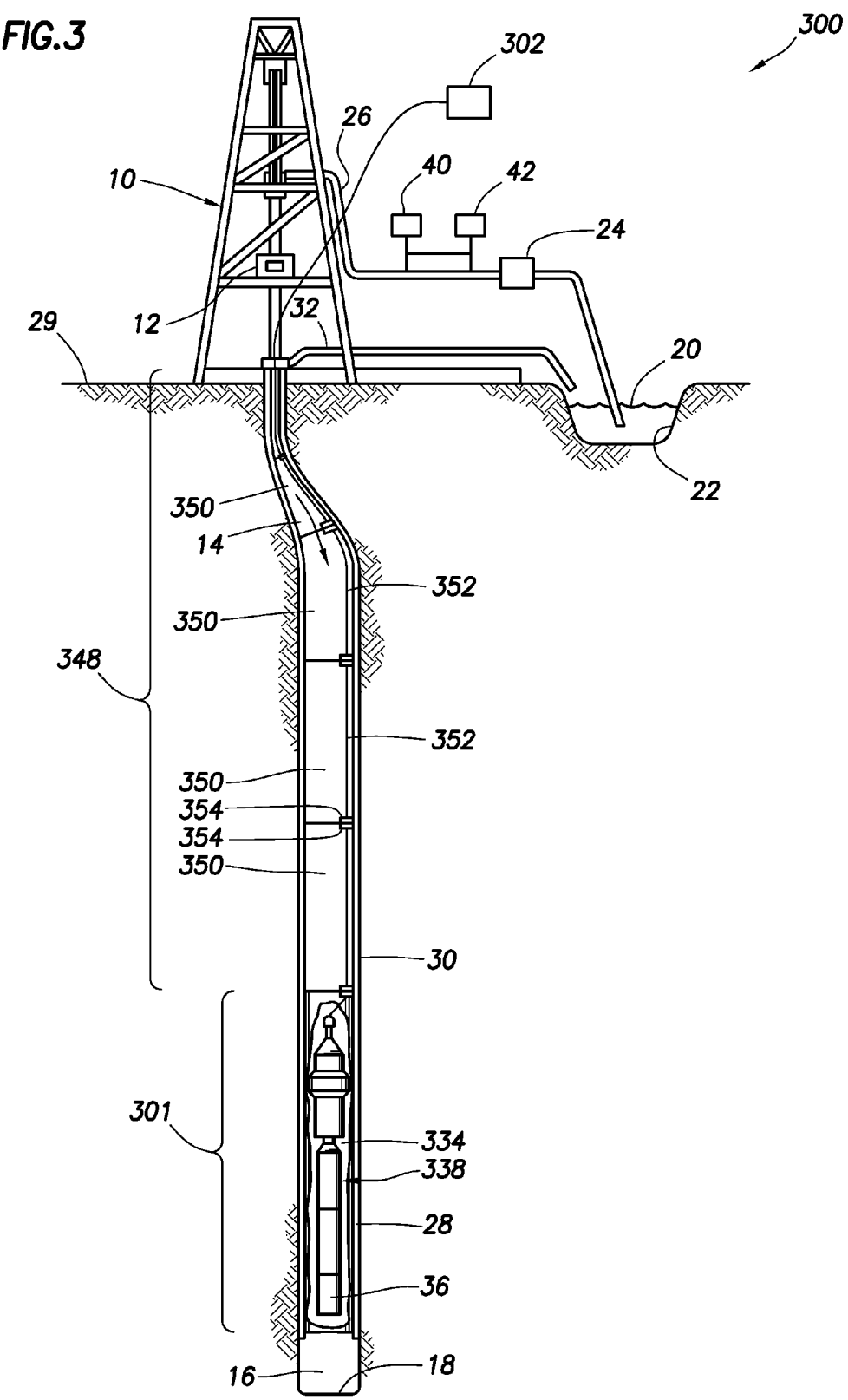
FIG. 3 is a schematic view, partially in cross-section, of another example telemetry system including a downhole tool having a wired drill pipe wellbore telemetry device.

FIG. 3 is a schematic view, partially in cross-section, of another example telemetry system 300 including a downhole tool 301 having a wired drill pipe wellbore telemetry system or device 348. In contrast to the known mud pulse telemetry system 100 depicted in FIG. 1, the example telemetry system 300 utilizes a mud pulse telemetry device 338 that is housed in a MWD tool 334 and includes the wired drill pipe telemetry system 348.

As shown in FIG. 3, the MWD tool 334 and the mud pulse telemetry device 338 may be positioned in the downhole tool 301. The MWD tool 334 may be implemented using a device that is similar or identical to that used to implement the MWD tool 34 of the FIG. 1 and/or the MWD tools 234a and 234b of FIG. 2. Similarly, the mud pulse telemetry device 338 may be implemented using a device that is similar or identical to that used to implement the mud pulse telemetry device 38 of FIG. 1 and/or the mud pulse telemetry devices 238a and 238b of FIG. 2. Additionally, the surface unit or computer 302 may be implemented in a manner similar to the surface unit or computer 202 described in connection with FIG. 2. Thus, the surface unit 302 may be operatively or communicatively coupled to the MWD tool 334 via the mud pulse telemetry device 338 and/or may be operatively or communicatively coupled to the wired drill pipe telemetry system 348 via one or more communication links (not shown). As with the example system 200 of FIG. 2, the surface unit or computer 302 may be proximate the drilling rig 10 or, alternatively, some or all of the surface unit or computer 302 may be remotely located relative to the drilling rig 10.

Turning in detail to the wired drill pipe wellbore telemetry system 348, it can be seen in the example of FIG. 3 that the system 348 extends substantially entirely through the drill string 14. An example of a wired drill pipe wellbore telemetry system that may be used to implement the system 348 is described in U.S. Pat. No. 6,641,434, which has been previously incorporated by reference herein. As depicted in FIG. 3, the wired drill pipe wellbore telemetry system 348 includes a plurality or series of wires 352 positioned in each drill pipe 350 that forms or composes the drill string 14. A coupler 354 is positioned at the end of each of the drill pipes 350 so that when the pipes 350 are connected, joined, or otherwise coupled, the drill string 14 provides a hardwired communication link extending through the drill string 14. While the wired drill pipe telemetry system 348 is depicted in FIG. 3 as extending substantially entirely through the drill string 14 to the MWD tool 334, the wired drill pipe telemetry system 348 may instead extend only partially through the drill string 14.

During operation, either or both of the mud pulse telemetry device 338 and the wired drill pipe system 348 may be used to enable communications between the downhole tool 301 (e.g., the MWD tool 334) and the surface unit 302. Depending on the particular operational mode of the rig 10 and/or downhole or other environmental conditions, the device 338 or the system 348 may be best suited to convey data to the surface unit 302. Alternatively or additionally, both the device 338 and the system 348 may be used to convey information between the surface unit 302 and the downhole tool 301 at the same time. In such a case, the conveyed information may concern the same downhole parameter(s) or condition(s) or different parameter(s) or condition(s).

Figure 4:
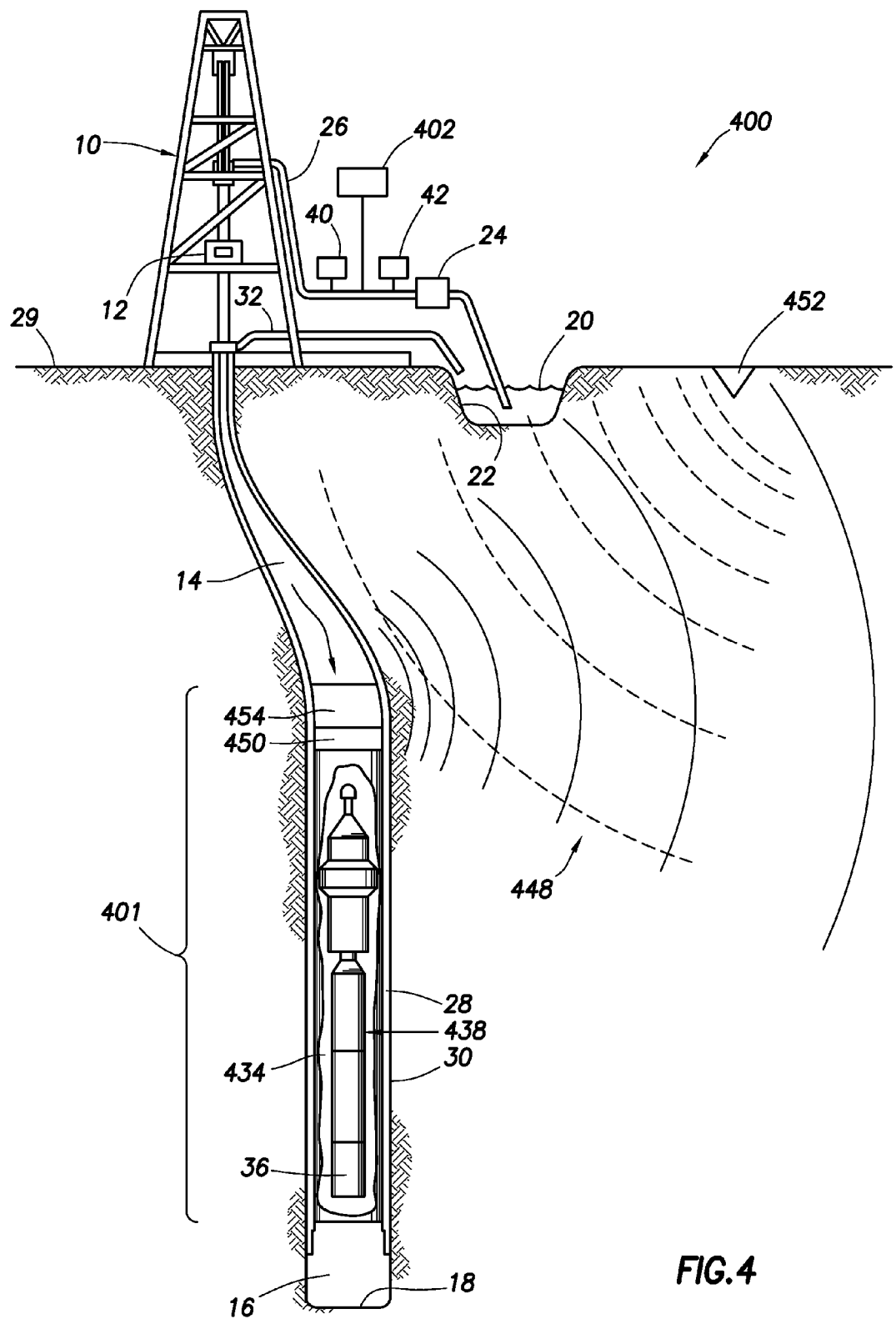
FIG. 4 is a schematic view, partially in cross-section, of a yet another example telemetry system including a downhole tool having a mud pulse telemetry device and an electromagnetic wellbore telemetry device.

FIG. 4 is a schematic view, partially in cross-section, of a yet another example telemetry system 400 including a downhole tool 401 having a mud pulse telemetry device 438 and an electromagnetic wellbore telemetry device 448. Similar to the systems 200 and 300 depicted in FIGS. 2 and 3, respectively, the system 400 includes a surface unit or computer 402 that can communicate with the downhole tool 401 and/or other downhole components and analyze information obtained therefrom. In this manner, the surface unit 402 may be operationally or otherwise coupled to a MWD tool 434 via, for example, the mud pulse telemetry device 438. Still further, as with the other systems 200 and 300, the surface unit 402 may be proximate the drilling rig 10 as shown, or some or all of the surface unit 402 may be remotely located relative to the drilling rig 10 and communicatively coupled via, for example, any desired combination of wireless and hardwired communication links to the system 400.

The mud pulse telemetry device 438 is position in the downhole tool 401 and may be implemented using the same device or a device similar to the device used to implement the device 38 of FIG. 1, the devices 238a and 238b of FIG. 2, and/or the device 338 of FIG. 3. Also, the MWD tool 434 is positioned in the downhole tool 401 and may be implemented using the same device or a device similar to the device used to implement the device(s) used to implement the tools 234a and 234b of FIG. 2, and/or 334 of FIG. 3.

The electromagnetic wellbore telemetry system 448 includes a downhole transceiver 454 and a surface transceiver 452. An example of an electromagnetic wellbore telemetry system that may be used to implement the system 448 of FIG. 4 is described in U.S. Pat. No. 5,624,051, previously incorporated by reference herein. As depicted in the example of FIG. 4, the electromagnetic wellbore telemetry system 448 is also provided with a gap collar 450, which is position in the downhole tool 401 to enhance the electromagnetic signals conveyed between the transceivers 452 and 454. An example of a gap collar that may be used to implement the collar 450 is described in U.S. Pat. No. 5,396,232.

While the example systems depicted in FIGS. 2-4 include certain combinations of mud pulse telemetry, wired drill pipe telemetry, and electromagnetic telemetry systems, other combinations of such systems may be employed to achieve the same or similar results. For example, a wellbore telemetry system using a mud siren, positive and/or negative pulse telemetry devices, an acoustic telemetry device, a tortional wave telemetry device, or any other telemetry device(s) could be used instead of or in addition to those depicted in FIGS. 2-4 to communicate with a surface unit or computer. Additionally, various combinations of communication links (e.g., wireless, hardwired, etc.) may be employed to provide selective communications between the surface unit and the telemetry devices to suit the needs of particular applications.

Still further it should be understood that the telemetry devices, or any combination thereof, used with the example systems described herein may be positioned in various configurations about the downhole tool. For example, the devices may be positioned adjacent to each other or, alternatively, at some desired distance or spacing apart, with or without components disposed therebetween. The telemetry devices may be oriented vertically as shown in the examples, or one or more of the devices may be inverted.

Figure 5:
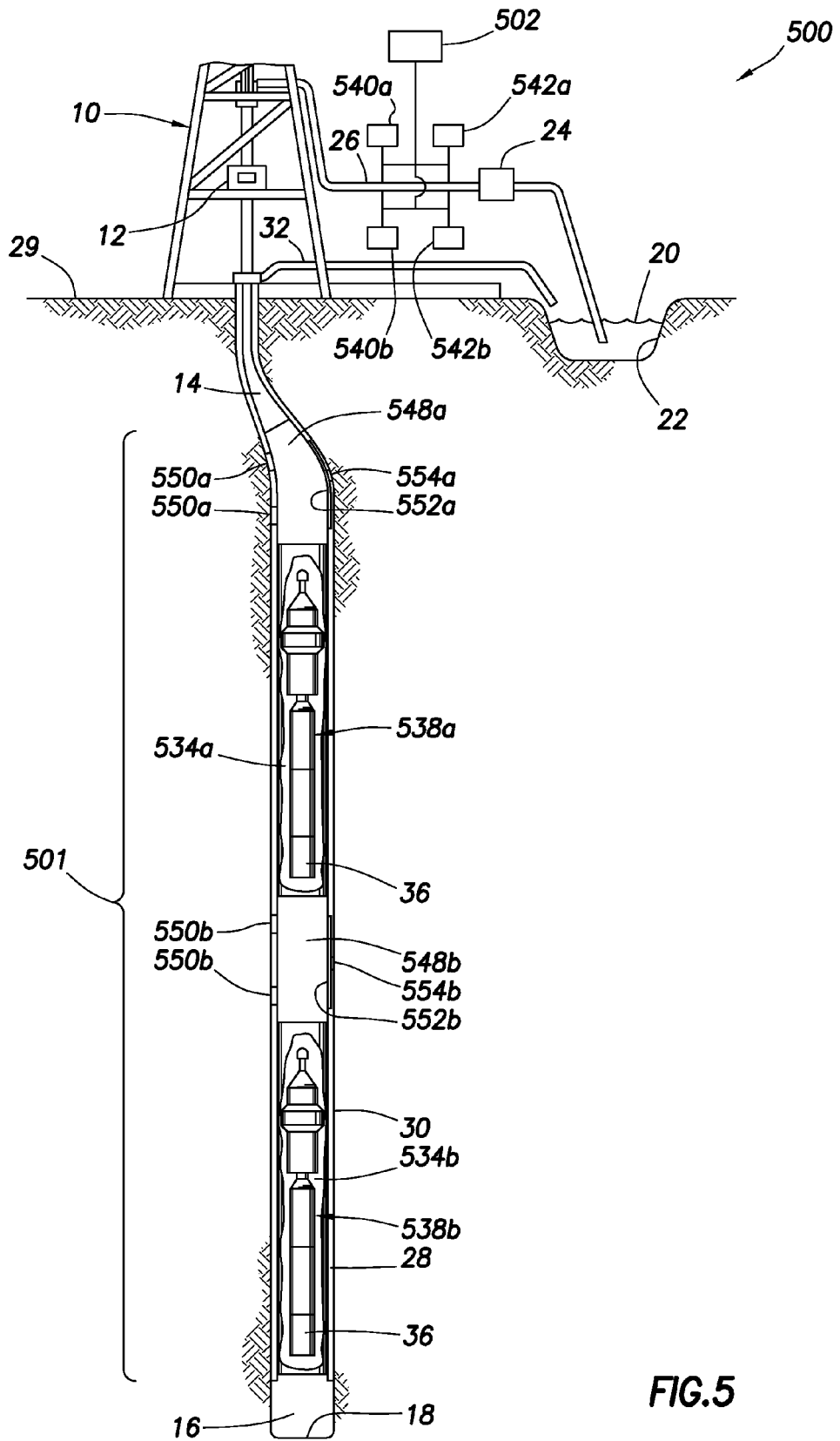
FIG. 5 is a schematic view, partially in cross-section, of still another example telemetry system including a downhole tool having multiple downhole components and multiple wellbore telemetry devices.

FIG. 5 is a schematic view, partially in cross-section, of still another example telemetry system 500 including a downhole tool 501 having multiple downhole components and multiple wellbore telemetry devices. As depicted in the example system 500 of FIG. 5, the downhole tool 501 includes two MWD tools 534a and 534b, two mud pulse telemetry devices 538a and 538b, two pressure transducers 540a and 540b, and two sensors 542a and 542b.

A surface unit or computer 502, which may be similar or identical to one or more of the example surface units 202, 302, and 402 of FIGS. 2, 3, and 4, respectively, may be communicatively and/or operationally coupled to the telemetry devices 538a and 538b and/or downhole components 548a and 548b. As with the other example surface units 202, 302, and 404, the example surface unit 502 may be proximate (e.g., onsite) or remotely situated (e.g., offsite) relative to the rig 10 and operationally and/or otherwise coupled to the telemetry systems, MWD tools 534a and 534b, and/or mud pulse telemetry devices 538a and 538b via any desired communication links (not shown). The MWD tools 534a and 534b may be implemented using devices similar or identical to those used to implement the MWD tools 34, 234a, 234b, 334, and/or 434. Similarly, the mud pulse telemetry devices 538a and 538b may be implemented using devices similar or identical to those used to implement the mud pulse telemetry devices 38, 238a, 238b, 338, and/or 438.

As depicted in FIG. 5, the downhole tool 501 houses the MWD tools 534a and 534b, the mud pulse telemetry devices 538a and 538b, and the downhole components 548a and 548b. In the example of FIG. 5, the downhole components 548a and 548b are depicted as formation evaluation tools, which may be used to test and/or sample fluid from a surrounding formation. Examples of such formation evaluation tools that may be used to implement the tools 548a and 548b are described in published U.S. Patent Application No. 2005/01109538, which is incorporated by reference herein in its entirety. As shown, the downhole components 548a and 548b include stabilizer blades 552a and 552b with probes 554a and 554b for drawing fluid into the downhole tool 501, and backup pistons 550a and 550b to assist in driving the probes 554a and 554b into position against the wall of the wellbore 30. The formation evaluation components 548a and 548b may enable various pressure testing and/or sampling procedures to be performed. Although the example of FIG. 5 depicts two formation evaluation components in the downhole tool 501, one or more than two formation evaluation components may be used instead.

In the example of FIG. 5, the wellbore telemetry devices 538a and 538b are operationally coupled to the respective downhole components 548a and 548b. However, one or more wellbore telemetry devices may be coupled to one or more formation evaluation components. For example, two wellbore telemetry devices may be coupled to the same downhole component or, alternatively, each wellbore telemetry device may be coupled to a single, respective downhole component. Additionally, a variety of formation evaluation components may be coupled to one or both of the wellbore telemetry devices 538a and 538b. As used herein, "formation evaluation component" refers to a device for performing formation evaluation such as, for example, sampling, detecting formation pressure while drilling, measuring resistivity, nuclear magnetic measurements, or any other downhole tool used to evaluate a subterranean formation.

Multiple wellbore telemetry devices and/or systems such as those described in connection with the example systems herein may be used to provide downhole tools with the ability to perform independent or integrated downhole operations. For example, one wellbore telemetry system and/or telemetry device may be used in conjunction with a downhole formation evaluation component to perform various testing operations, while a second telemetry device may be used to perform resistivity operations. Additional wellbore telemetry systems and/or devices may be provided as desired. In some cases it may be desirable to use certain wellbore telemetry systems or devices in conjunction with certain downhole components to perform certain downhole operations.

Measurements taken using the wellbore telemetry devices may be compared and analyzed. In this manner, duplicate or redundant measurements may be taken for calibration and/or verification purposes. Additionally, duplicate or redundant measurements may be taken at different positions (at the same or different times) to determine differences in the formation at various downhole locations. Measurements taken by different components may also be analyzed to determine, for example, performance capabilities and/or formation properties.

The separate or individual functionality of the wellbore telemetry devices may also be used to enhance power capabilities needed to perform continuous or additional operations. Multiple wellbore telemetry devices may also be used to increase data transmission rates to the surface and/or to eliminate the need for batteries in the downhole tool. The use of multiple wellbore telemetry devices may also provide a backup system in a case where one of the wellbore telemetry systems fails or is otherwise unable to function properly. Further, in cases where two different wellbore telemetry systems and/or devices are used, alternative types of communications may be employed as desired or needed to provide more effective communications between a downhole tool and a surface unit. Still further, any desired communication medium or combination of media may be used to implement the telemetry systems described herein. For example, any combination of wireless and/or hardwired media may be used to suit the needs of particular applications. More specifically, wireless media may include drilling mud, electromagnetic signals, acoustic signals, etc., and hardwired media may include wired drill pipe and/or any other media using electrical conductors.

As noted above in connection with the examples of FIGS. 2, 3, 4, and 5, the surface units 202, 302, 402, and/or 502 may be located onsite or offsite (e.g., relative to the rig) and may be communicatively and/or operationally coupled to one or more respective downhole tools via communication links (not shown). The communication links may be implemented using any desired wireless and/or hardwired link capable of transmitting data between wellbore telemetry devices and surface units or computers. In some examples, the communication link may be coupled to a wellbore telemetry device via an intermediary device such as, for example, a pressure transducer. The communication link provides means for passing signals such as command, data, power or other signals between the wellbore telemetry devices and the surface computer. These signals may be used to control the downhole tool and/or to retrieve data collected by the downhole tool. Preferably, but not necessarily, signals are passed in real time to provide fast and efficient data collection, tool operation and/or response to wellbore conditions.

One or more communication links may be provided to operatively couple the wellbore telemetry system(s) and/or device(s) to one or more surface unit(s). In this manner, each wellbore telemetry device and/or system can selectively communicate with one or more surface unit(s). Alternatively, such links may couple the wellbore telemetry system(s) and/or device(s). The telemetry device(s) may communicate with the surface via a wellbore telemetry system. Various communication links may be provided so that the wellbore telemetry devices and/or systems may communicate with each other and/or the surface unit(s) independently, simultaneously or substantially simultaneously, alternately (e.g., while one telemetry device is actively communicating, other telemetry devices are not actively communicating), and/or during selected (e.g., predetermined) time frames or intervals.

The signals and/or other communications conveyed via the example wellbore telemetry systems described herein may be used or manipulated to enable the efficient flow of data or information. For example, the example telemetry devices and/or systems may be selectively operated to pass data from the downhole tool to the surface unit or computer. Such data may be passed from the telemetry devices and/or systems at similar or different frequencies, simultaneously or substantially simultaneously, and/or independently. The data and/or signals may be selectively manipulated, analyzed, or otherwise processed to generate an optimum and/or desired data output. The data (e.g., the output data) may be compared (e.g., to reference values, threshold values, etc.) and/or analyzed to determine wellsite conditions, which may be used to adjust operating conditions, locate valuable hydrocarbons, and/or perform any other desired wellsite operations or functions.

The wired drill pipe drill string telemetry system described above (e.g., the example system of FIG. 3) may be used to provide relatively high bandwidth transmission of MWD signals. However, the noise cancellation or suppression systems and methods described below in connection with FIGS. 6-14 can be used with wired drill pipe to improve the signal-to-noise ratio and increase the bandwidth of mud pulse telemetry signals. More specifically, one or more pressure transducers can be distributed or spaced along a section of wired drill pipe in an upper portion of a drill string. The pressure transducers may form a linear array that provides pressure signals that can be processed using vertical seismic profiling techniques such as velocity filtering and stacking as described below to cancel, suppress, or reduce the effects of downwardly propagating noise (e.g., mud pump noise and/or other rig noise) while enhancing upwardly propagating MWD signals (e.g., mud pulse telemetry signals). In addition, the downwardly propagating noise may be reflected from obstacles in the drill string, resulting in upwardly propagating noise. This upwardly propagating noise may also be removed from the MWD signals.

As used herein, the term "MWD signals" is used to refer to data that is gathered or collected downhole and sent to the surface via telemetry. It is understood that a telemetry tool may be used to convey LWD signals or other types of data, but the term "MWD signals" is used for convenience.

In many MWD operations, especially offshore, the MWD mud pulse telemetry is limited to a very low data rate (<<10 bits/sec). The low data rate results from a low signal-to-noise ratio, which can be caused by high noise levels generated by mud pumps and other rig-based equipment, by mud pump noise in the frequency band of the MWD mud pulse telemetry, and by the exponential attenuation of the MWD signal with depth. The pressure P(Z) measured a distance Z (m) from the mud pulser is attenuated according to $P(Z)=P_0 e^{-Z/L}$ where $P_0$ is the pressure at the mud pulser, and where $$L = a\sqrt{\frac{2B}{\eta\omega}}$$

is an effective length. The inner radius of the drill pipe number is a (m); the angular frequency is ω (radians/S); the bulk modulus of the mud is B (Pa); and the viscosity is η (centipose). The attenuation increases with frequency and with the viscosity of the drilling mud. (Reference: New Mud Pulse Telemetry Techniques for Deepwater Applications and Improved Real-Time Data Capabilities, SPE/ADC 67762, R. Hutin et al, 2001). Standard practice is to lower the mud pulse frequency to reduce the attenuation, and/or to shift the mud pulse frequency to avoid frequencies where there is high mud pump noise. In deepwater operations, there may be up to 10,000 feet (3048 m) of cold water between the rig and the seabed. The cold water increases the drilling mud viscosity, which increases the attenuation, and thus further reducing the mud pulse frequency and MWD telemetry data rate.

The systems and methods described below enable a relatively small amount of wired drill pipe (i.e., the entire drill string need not be composed of wired drill pipe) to enable relatively high bandwidth communications using a mud pulse telemetry system. In particular, the noise cancellation, suppression, or reduction systems and methods described herein utilize a relatively small amount of wired drill pipe and pressure transducers to enable a mud pulse telemetry system to communicate effectively at a higher data rate and/or at greater depths, thereby eliminating the need to use wired drill pipe along the entire drill string to achieve a high data rate and/or to communicate at greater depths. This eliminates the need to wire downhole drill string components such as positive displacement motors, jars, and heavy weight drill pipe. Furthermore, by deploying the pressure transducers near the seabed, one avoids the increased attenuation due to the effect of cold seawater on the viscosity of the drilling mud.

Figure 6:
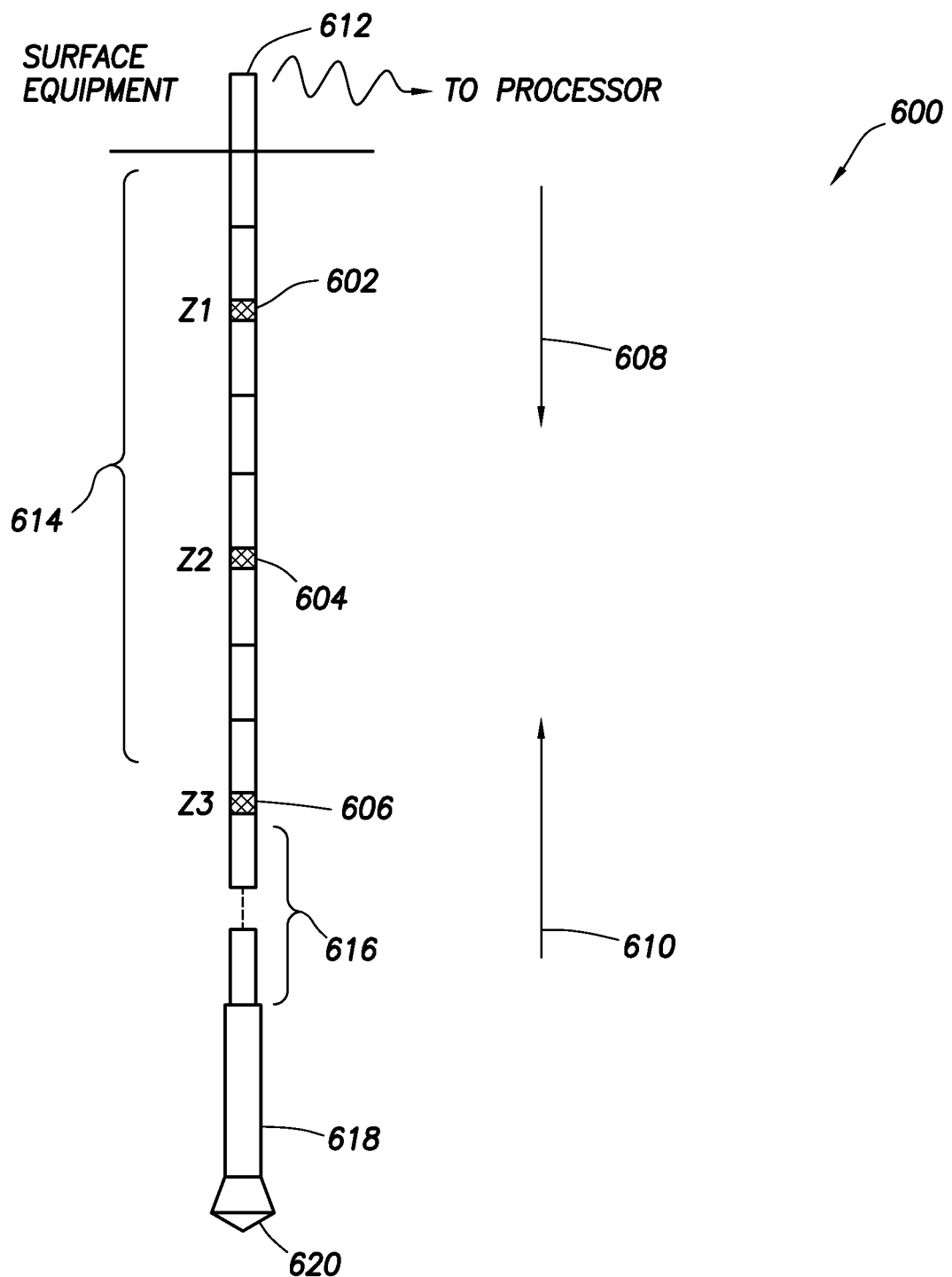
FIG. 6 is a schematic view of an example drill string telemetry system including an array of pressure transducers to separate downwardly propagating rig noise from upwardly propagating measurement while drilling signals.

FIG. 6 is a schematic view of an example drill string telemetry system 600 including an array of pressure transducers 602, 604, and 606 to cancel, reduce, suppress, or separate downwardly propagating rig noise 608 from an upwardly propagating MWD signal 610. While three pressure transducers 602, 604, and 606 are depicted in the example of FIG. 6, fewer pressure transducers (e.g., one transducer in the wellbore area of the drill string) or more than three pressure transducers may be used instead. However, as described in greater detail below, the use of multiple pressure transducers may result in a greater signal-to-noise ratio for MWD signals generated by a mud pulse telemetry system than possible with, for example, a system employing only one pressure transducer. The example drill string telemetry system 600 includes a drill string 612 that is composed of a wired drill pipe portion 614 and a normal drill pipe portion 616 that is not wired. In the example of FIG. 6, the wired drill pipe portion 614 is located in the upper portion of the drill string 612 and the normal drill pipe portion 616 is located in the lower portion of the drill string 612. The example drill string 612 also includes an MWD telemetry device 618 (e.g., an MWD pulser for mud pulse telemetry) that is adjacent to a bit 620, which is disposed at the bottom end of the example drill string 612.

The pressure transducers 602, 604, and 606, an example implementation of which is depicted and described in connection with FIG. 7, may be spaced apart or separated along the wired drill string portion 614 of the drill string 612 at, for example, intervals preferably about a quarter wavelength of the telemetry signals. For telemetry performed at lower frequencies (e.g., frequencies of a few Hertz), it may be desirable to space the pressure transducers 602, 604, and 606 a hundred or more meters apart, thereby requiring one or more of the pressure transducers 602, 604, and 606 to be located in the borehole. Locating one or more of the pressure transducers 602, 604, and 606 in the borehole increases the distance between the transducers and mud pumps and/or other sources of rig noise, thereby further improving the signal-to-noise ratio of the MWD signal 610.

In general, the use of pressure transducers in connection with MWD mud pulse telemetry systems is known. One such use is described in U.S. Pat. No. 6,741,185, entitled "Digital Signal Receiver for Measurement While Drilling System Having Noise Cancellation," the entire disclosure of which is incorporated by reference herein. Typically, in contrast to the example system of FIG. 6, these known systems locate one pressure transducer near the mud pump(s), which are primary source of acoustic noise, and another pressure transducer in the standpipe. Thus, both pressure transducers are located relatively close to the source of the rig noise. Signals received from the sensors or transducers are then typically processed or combined to cancel or reduce the effects of the noise signals generated by the mud pump(s). The separation between the transducer located near the mud pump(s) and the transducer in the standpipe affects the degree to which mud pump noise can be canceled or suppressed. A separation of about an eighth of a wavelength (i.e., the wavelength of the mud pulse telemetry signals) or about a quarter of a wavelength is typically used to provide the greatest signal-to-noise ratio for the mud pulse telemetry signals. However, in practice, such separations on the surface near the rig are usually not possible due to the low frequency and long wavelength of the mud pulse telemetry signals and the limited path length associated with the pressure equipment on the rig. Furthermore, pressure transducers 40 are normally located above the rig floor in the mud line 26. Mud pump noise is reflected by the transition from the mud line to drill pipe, which results in complex standing waves that make it difficult to filter the mud pump noise.

In contrast to the known use of pressure transducers noted above, in the example of FIG. 6, the pressure transducers 602, 604, and 606 are located on the drill string 612 in relatively downhole locations, thereby reducing the surface noise to which the sensors 602, 604, and 606 are subjected. The downhole locations of the transducers 602, 604, and 606 and the spacing between the transducers 602, 604, and 606 may be selected based on the acoustic velocity in drilling mud and the frequency at which mud pulse telemetry signals are transmitted by the MWD telemetry device 618. More specifically, the acoustic velocity in drilling mud ranges between about 1 km/sec to 1.5 km/sec, and mud pulse telemetry signals are typically transmitted at a frequency of between about 1 Hz and 24 Hz. The table below provides quarter wavelength sensor spacing in meters for different acoustic velocities and mud pulse telemetry transmission frequencies.

| Quarter-Wavelength Spacing | | |
|---|---|---|
| Mud Pulse Freq. | 1 km/sec. | 1.5 km/sec. |
| 1 Hz | 250 m | 375 m |
| 12 Hz | 21 m | 31 m |
| 24 Hz | 10 m | 16 m |

In view of the foregoing quarter wavelength information, a particular example in connection with the example configuration of FIG. 6 is now provided. For example, assume a final bit run begins at a measured depth of 7 kilometers and that the total depth to which the well is to be drilled is 10 kilometers. At the beginning of the final bit run, the MWD telemetry device or pulser 618 may be run into the borehole such that the normal drill pipe 616 is about 6.5 km in length and the wired drill pipe 614 is about 0.5 km in length. Special subs (e.g., the example sub 700 depicted in FIG. 7) containing the pressure transducers 602, 604, and 606, batteries, electronics, processors, communications circuitry, etc. may be uniformly spaced between selected wired drill pipe segments in the wired drill pipe 614 portion of the drill string 612. For example, three such subs could be spaced apart by 250 meters to provide quarter wavelength spacing for 1 Hz MWD signals. The subs (e.g., located at the pressure sensors 602, 604, and 606) can communicate with a surface computer or unit via the communication channel provided by the wired drill pipe 614. In one example, the signals from the pressure transducers 602, 604, and 606 may be sampled and digitized at approximately 200 Hz. The digitized information associated with the transducers 602, 604, and 606 may then be transmitted to a surface computer for further processing via the wired drill pipe 614 or other drill string telemetry (e.g., as described below in connection with FIG. 13). In the example where the drill string telemetry is the wired drill pipe 614, data rates of between about 10 to 50 kbits/sec. are possible, thereby easily accommodating the bandwidth needed to transmit the digitized information.

As drilling continues, an additional 3 km of wired drill pipe 614 is added to reach the total depth of 10 km. In this manner, the distances between the MWD pulser 618 and the pressure transducers 602, 604, and 606 do not increase with drilling. As a result, the signal-to-noise ratio of the MWD signal 610 does not degrade with depth. On the contrary, the signal-to-noise ratio may be increased by adding additional pressure sensors (not shown) to the drill string 612. Additionally, the signal-to-noise ratio improves as the distance between the pressure transducers and surface noise sources increases with depth. In deepwater offshore, the attenuation of the downwardly propagating noise due to the effect of cold water on the drilling mud viscosity is beneficial when the pressure transducers are located near the seabed.

Figure 7:
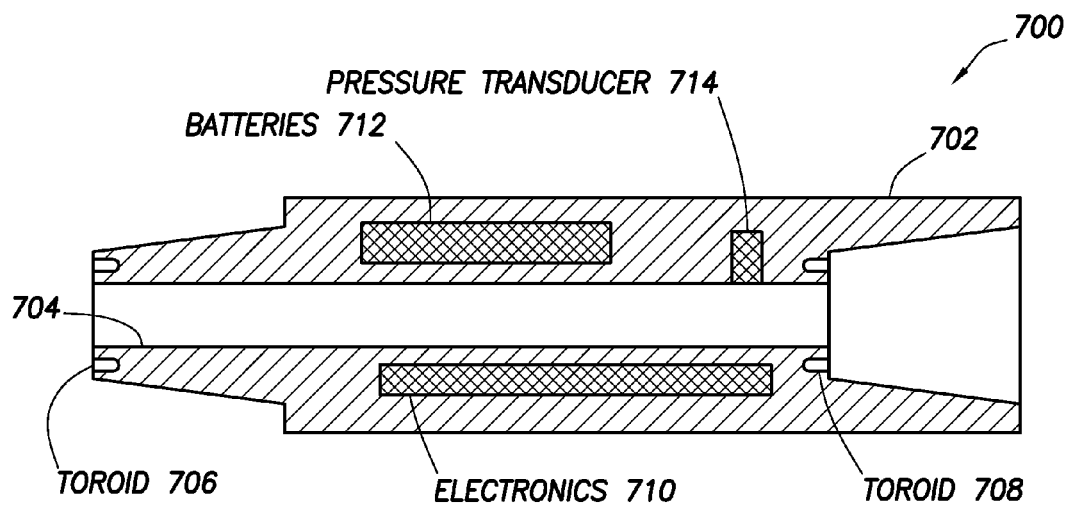
FIG. 7 is a cross-sectional view of an example sub that may be used to implement the pressure transducers in the example drill string telemetry system of FIG. 6.

FIG. 7 is a cross-sectional view of an example sub 700 that may be used to implement the pressure transducers 602, 604, and 606 in the example drill string telemetry system 600 of FIG. 6. The example sub 700 includes a collar 702 having a passage 704 through, toroids 706 and 708, electronics 710, batteries 712, and a pressure transducer 714. The sub 700 allows telemetry signals to pass through it, and can itself receive and send telemetry signals. In one example, the toroids 706 and 708 are connected by a wire or other electrical connection. In the example of FIG. 7, the pressure transducer 714 is configured to measure pressure in the interior of the sub 700 (e.g., in the passage 704). However, an annular or exterior pressure measurement could be used instead of or in addition to the interior pressure measurement. The electronics 710, which are powered by the batteries 712, may include interface and signal conditioning circuitry or programming to condition signals received from the pressure transducer 714. The electronics 710 may also include communications circuitry to enable pressure information (e.g., measured pressure values) to be conveyed via the wired drill pipe 614. Specifically, the communications circuitry may be configured to provide varying electrical currents to the toroids 706 and 708 to magnetically couple the pressure signal information to a surface unit (e.g., similar or identical to the surface unit 302 of FIG. 3) via the wires in the wired drill pipe 614. Transformers other than toroids, and/or electrical contacts may be used to connect the sub 700 to the wired drill pipe.

The pressure transducers 602, 604, and 606 of FIG. 6 form an array that may be used to provide a plurality of pressure signals that can be processed to improve the signal-to-noise ratio of the MWD signal 610.

As described in greater detail in conjunction with FIGS. 8-14 below, the signals from the pressure sensors 602, 604, and 606 may be processed to enhance the upwardly propagating MWD signal 610 while decreasing the effects of downwardly propagating surface noise (e.g., the mud pump noise 608 of FIG. 6) on the MWD signal 610. As a result, the signal-to-noise ratio of the MWD signal 610 can be increased.

The method exploits the fact that the mud pump and other noise from the rig initially propagates downwardly, while the MWD mud pulse signal propagates upwardly. This is a velocity filtering technique. The signals at the pressure transducers 602, 604, and 606 may be time-shifted corresponding to a downwardly propagating wave and averaged to estimate the downwardly propagating noise signal (e.g., an enhanced form of the mud pump noise signal 608). This estimated noise signal may then subtracted from each of the signals provided by the pressure transducers 602, 604, and 606 to provide corrected pressure signals. The corrected pressure signals are then time-shifted corresponding to an upwardly propagating wave and averaged to enhance the upwardly propagating MWD signal 610. As described further below, the time-shifting and stacking (i.e. averaging) are performed by determining the velocity of the acoustic waves or signals associated with the mud pump noise 608 and the MWD signal 610. The velocity of the acoustic waves, which may vary slowly over time, can be determined using, for example, a cross-correlation technique as described later.

Figure 8:
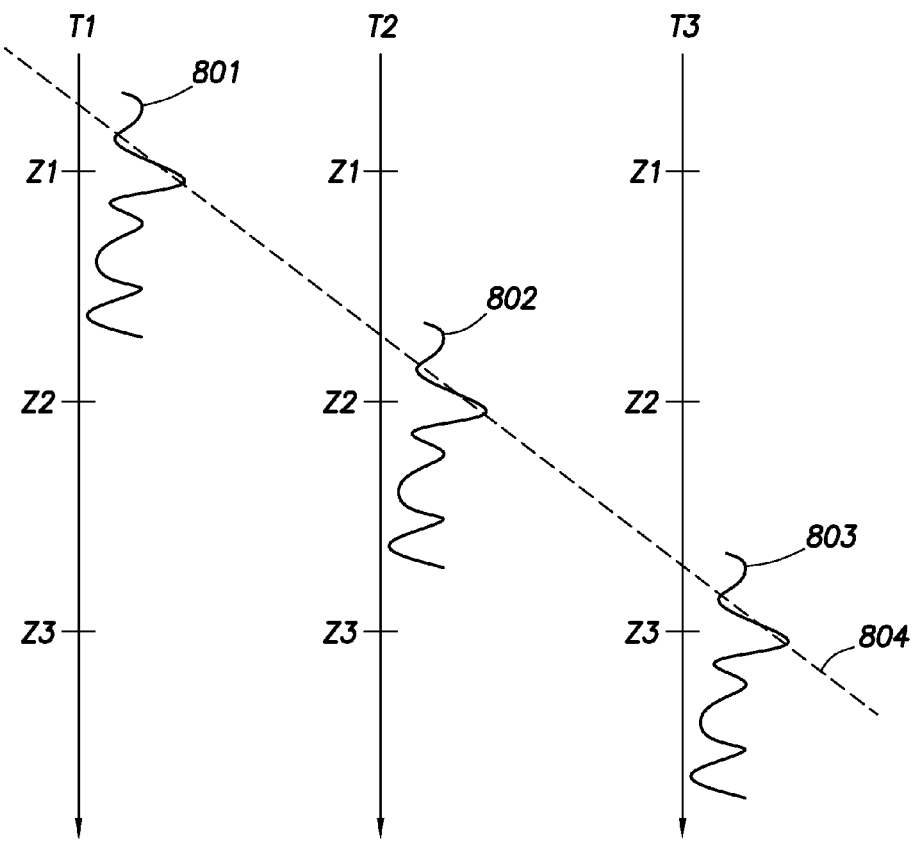
FIG. 8 depicts an example manner in which the example drill string telemetry system of FIG. 6 may be used to detect downwardly propagating noise.

FIG. 8 depicts an example manner in which the example drill string telemetry system 600 of FIG. 6 may be used to detect downwardly propagating noise. The technique described in connection with FIG. 8 uses signals associated with the pressure transducers 602, 604, and 606 of FIG. 6, corresponding to respective drill string locations Z1, Z2, and Z3 in FIGS. 6 and 8. The three vertical axes correspond to respective times T1, T2, and T3 during which mud pump noise 608 propagates downwardly past locations Z1, Z2 and Z3 along the drill string 612. As indicated in FIG. 8, the waveform of the downwardly propagating noise remains relatively unchanged over the array of pressure transducers provided there are no major obstacles in the drill pipe within the array. The pressure transducers 602, 604, and 606 generate respective pressure signals $S1(t)$, $S2(t)$ and $S3(t)$ as functions of time in response to the downwardly propagating noise waveform, shown at times T1 801, T2 802, and T3 803. More specifically, pressure measurements are obtained at discrete times $\{t1, t2, t3, \ldots\}$, with constant time increments of $\Delta t$. The time increment $\Delta t$ should be sufficiently short to obtain several measurements per cycle. It is understood that the notation $S1(t)$ actually represents many discrete measurements; that is, the pressure measurements are made and recorded at large number of discrete times. Noise from the rig mud pumps and/or other surface equipment propagates downwardly with velocity V, represented by the diagonal line 804 in FIG. 8. There are similar signals at the pressure transducers 602, 604, and 606 when Z1−(V·T1)=Z2−(V·T2)=Z3−(V·T3). The signals from the pressure transducers 602, 604, and 606 may then be time-shifted and averaged to provide an estimate of the downwardly propagating noise (e.g., the mud pump noise 608) as a function of time according to the equation $$N_D(t) = \{S1(t) + S2(t+Z2-Z1)/V) + S3(t+Z3-Z1)/V)\}/3.$$

In FIG. 8, this is equivalent to moving waveforms 802 and 803 in alignment with waveform 801 and then averaging the waveforms. In determining the estimated downwardly propagating noise $N_D(t)$, it is assumed that the signals S1($t$), S2($t$) and S3($t$) have been properly normalized to account for any attenuation between the pressure transducers and to account for variations in the sensitivities of the pressure transducers. The estimated noise function $N_D(t)$ can then be used to correct the signals received at each of the pressure transducers 602, 604, and 606 to produce corrected pressure transducer signals R1($t$), R2($t$), and R3($t$) as set forth below.

$$R1(t) = S1(t) - N_D(t)$$

$$R2(t) = S2(t) - N_D(t+(Z2-Z1)/V)$$

$$R3(t) = S3(t) - N_D(t+(Z3-Z1)/V)$$

Figure 9:
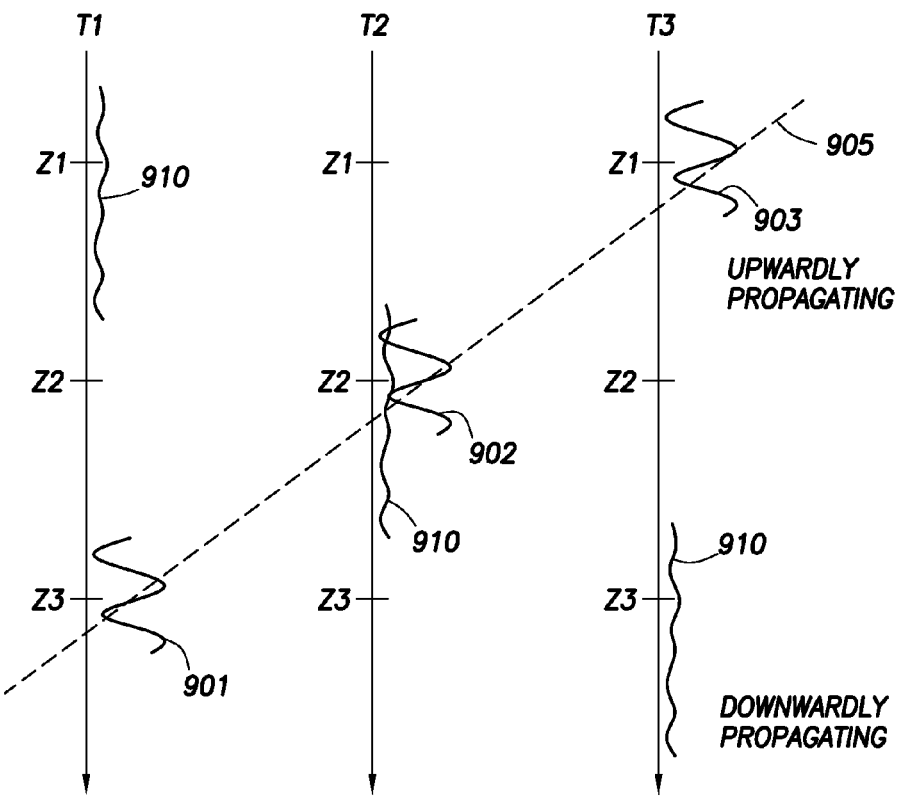
FIG. 9 depicts an example manner in which the example drill string telemetry system of FIG. 6 may be used to correct upwardly propagating measurement while drilling signals based on downwardly propagating noise signals.

As shown in FIG. 9, the corrected pressure transducer signals may include some residual downwardly propagating noise 910, which may not have a significant impact on an upwardly propagating signal, represented by 901, 902, and 903 at the times T1, T2 and T3. The corrected pressure transducer signals R1($t$), R2($t$), and R3($t$) can then be time-shifted and averaged to enhance the upwardly propagating signal, which may be, for example, the MWD signal 610 of FIG. 6. The velocity of the upwardly propagating signal V is represented by the diagonal line 905 in FIG. 9. More specifically, the upwardly propagating signal is similar at each of the pressure transducer locations Z1, Z2, and Z3 when $$Z1+(V·T3) = Z2+(V·T2) = Z3+(V·T1).$$

The time-shifted, upwardly propagating signal can then be represented using the expression $$F_U(t) = \{R1(t+(Z3-Z1)/V) + R2(t+(Z2-Z1)/V) + R3(t)\}/3.$$

The waveforms 901 and 902 are essentially time-shifted to coincide with waveform 903 and then averaged.

Initially, the velocity V can be estimated from the physical properties of the drilling mud. However, a more precise determination can be made by cross-correlation of downwardly propagating noise or by cross-correlation of the upwardly propagating MWD signals. For example, consider the signals S1($t$) and S2($t$). A sliding window of m data points is used in the cross-correlation. The length of the time window, mΔt, should be sufficiently long to contain a few cycles. The mean value for the signal measured at Z1 is $$\overline{S_1} = \frac{1}{m}\sum_{k=0}^{m-1} S_1(t_{k+i})$$

for $\{t_i, t_{i+1}, t_{i+2}, t_{i+3}, \ldots, t_{i+m-1}\}$, and the mean value for the signal measured at Z2 is $$\overline{S_2} = \frac{1}{m}\sum_{k=0}^{m-1} S_2(t_{k+j})$$

for $\{t_j, t_{j+1}, t_{j+2}, t_{j+3}, \ldots, t_{j+m-1}\}$. Note that the two time windows will be different, i.e. i≠j. The cross-correlation function C12($d$) between S1($t$) and S2($t$) is defined as $$C_{12}(d) = \sum_{k=0}^{m-1}\{[S_1(tk) - \overline{S_1}] \cdot [S_2(tj) - \overline{S_2}]\}$$

where j=k+d. The cross-correlation function C12($d$) achieves a maximum value when the time lag is given by $$d \cdot \Delta t = \frac{Z_2 - Z_1}{V}.$$

Hence, the velocity is obtained by calculating the cross-correlation function C12($d$), finding the value for d corresponding to the maximum of C12($d$), and then using $$V = \frac{(Z_2 - Z_1)}{d \cdot \Delta t}.$$

This velocity can then be used for shifting and stacking signals, and to obtain the estimate of downwardly propagating noise $N_D(t)$. Velocities can be similarly calculated for all adjacent pairs of pressure transducers, and the results averaged to increase accuracy. An alternative approach and/or complimentary approach is to compute the cross-correlation function for upwardly propagating waves to obtain the velocity V.

Figure 10:
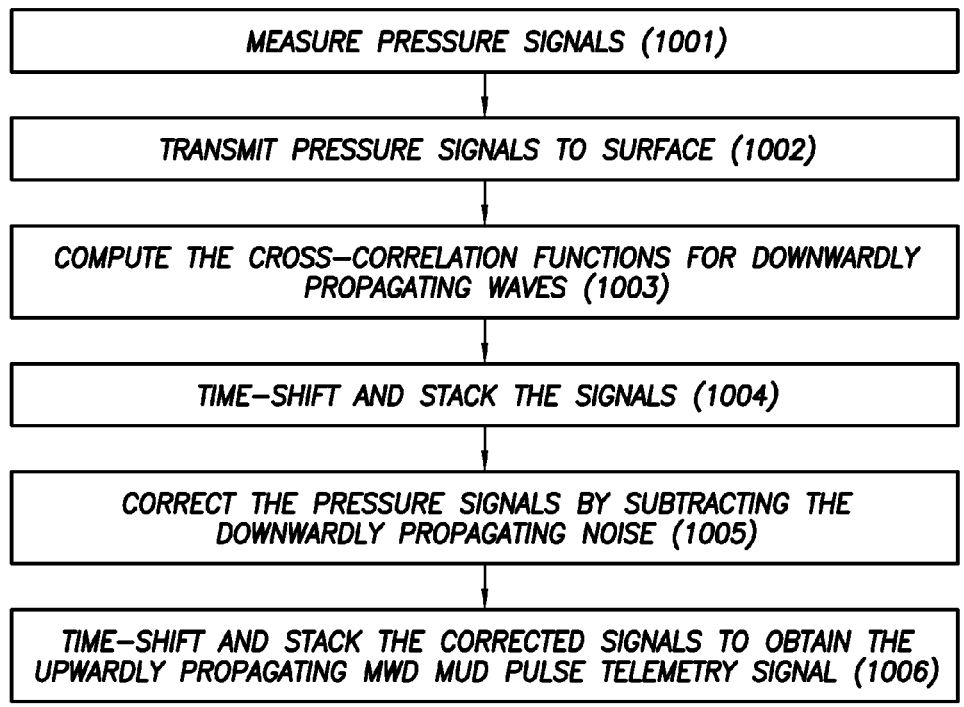
FIG. 10 is a flow chart describing the process for correcting the pressure transducer signals for downwardly propagating mud pump noise.

FIG. 10 shows an example of a method that uses an algorithm to separate downwardly propagating waves from upwardly propagating waves. In the particular example shown in FIG. 10, a downwardly propagating noise signal may be separated from an upwardly propagating MWD signal. Those having skill in the art will realize that the principles of the invention may be used on other types of signals as well. Further, in addition to using the example methods described herein, f-k processing, as is known in the seismic interpretation art, may be used in conjunction with other principles of the present invention to separate downwardly propagating waves from upwardly propagating waves.

The example method shown in FIG. 10 includes measuring pressure signals at a plurality of locations at a plurality of times, at 1001. This may be accomplished by positioning two or more pressure sensors within a drilling system. The pressure sensors may for part of a sub that is positioned within the drill string, or they may form part of a wireline tool that is positioned within the wellbore, for example in the drill string. Other examples include positioning pressure sensors in casing, possible for casing drilling or in a coiled tube. The manner in which the pressure sensors are positioned within the drilling system is not intended to limit the invention. In one particular example, three pressure sensors may be used, although other numbers of pressure sensors may be used.

In one example, the method includes measuring the pressure at two locations, represented by S1($t$) and S2($t$). The pressure measurements may be made at two or more different times, such as t1 and t2. In another example, the pressure measurements may be made at three or more locations, $S1(t)$, $S2(t)$, and $S3(t)$ at three or more different times, t1, t2, t3, etc. In one example, the times t1, t2, t3 are equally spaced. The method may next include transmitting the measured pressure signals to the surface, at 1002. In one example, the pressure data may be transmitted through a wired drill pipe. In another example, the pressure data may be transmitted using another telemetry device, such as an electromagnetic telemetry tool. In still another example, the pressure data may be transmitted through a wireline.

The method may next include determining the velocity of signals in the wellbore fluid. In one example, the signal velocity may be known or measured in any manner known in the art. In the example method shown in FIG. 10, determining the velocity may include computing one or more cross-correlation functions, at 1003. In one example, a cross-correlation function for the first two pressure measurements $S1(t)$, $S2(t)$ is represented by $C12(d)$. In one particular example, the cross-correlation function is represented as $$C_{12(d)} = \sum_{k=0}^{m-1} \{[S_1(tk) - \overline{S_1}] \cdot [S_2(tj) - \overline{S_2}]\}.$$

In this example, the cross-correlation function achieves a maximum value when the time lag is given by $$d \cdot \Delta t = \frac{Z_2 - Z_1}{V}.$$

Thus, by determining the maximum value for the cross-correlation function, the velocity V of the downwardly propagating noise signal may be determined.

The method may next include time-shifting and stacking the pressure signals to obtain the downwardly propagating noise signal, at 1004. In one example, there are two pressure signals $S1(t)$ and $S2(t)$, and one of the pressure signals is time-shifted so that the pressure signals may be stacked to obtain the downwardly propagating noise signal. In another example, three pressure signals, $S1(t)$, $S2(t)$, and $S3(t)$ are time-shifted and stacked, according to the following equation:

$$N_D(t)=\{S1(t)+S2(t+(Z2-Z1)/V)+S3(t+(Z3-Z1)/V)\}/3.$$

Those having skill in the art will be able to devise other equations for time-shifting and stacking, as well as be able to devise equations for time-shifting and stacking a number of pressure signals other than 3. The above equations are provided only as an example.

The method may next include correcting the pressure signals by subtracting the downwardly propagating noise, at 1005. In the case where there are three pressure sensors, one example of correcting the pressure measurement includes using the equations $R1(t)=S1(t)-N_D(t)$, $R2(t)=S2(t)-N_D(t+(Z2-Z1)/V)$, and $R3(t)=S3(t)-N_D(t+(Z3-Z1)/V)$.

The method may include stacking the corrected signals to obtain the upwardly propagating MWD signal, at 1006. This may be done for any number of pressure measurements. For example, in the case with two pressure measurements, one of the corrected signals may be time-shifted and stacked with the other signal to provide the upwardly propagating MWD signal. In another example, three corrected pressure signals are time-shifted and stacked, in accordance with the following equation:

$$F_U(t)=\{R1(t+(Z3-Z1)/V)+R2(t+(Z2-Z1)/V)+R3(t)\}/3.$$

Those having ordinary skill in the art will be able to devise methods for time-shifting and stacking other numbers of corrected pressure signals.

Figure 11:
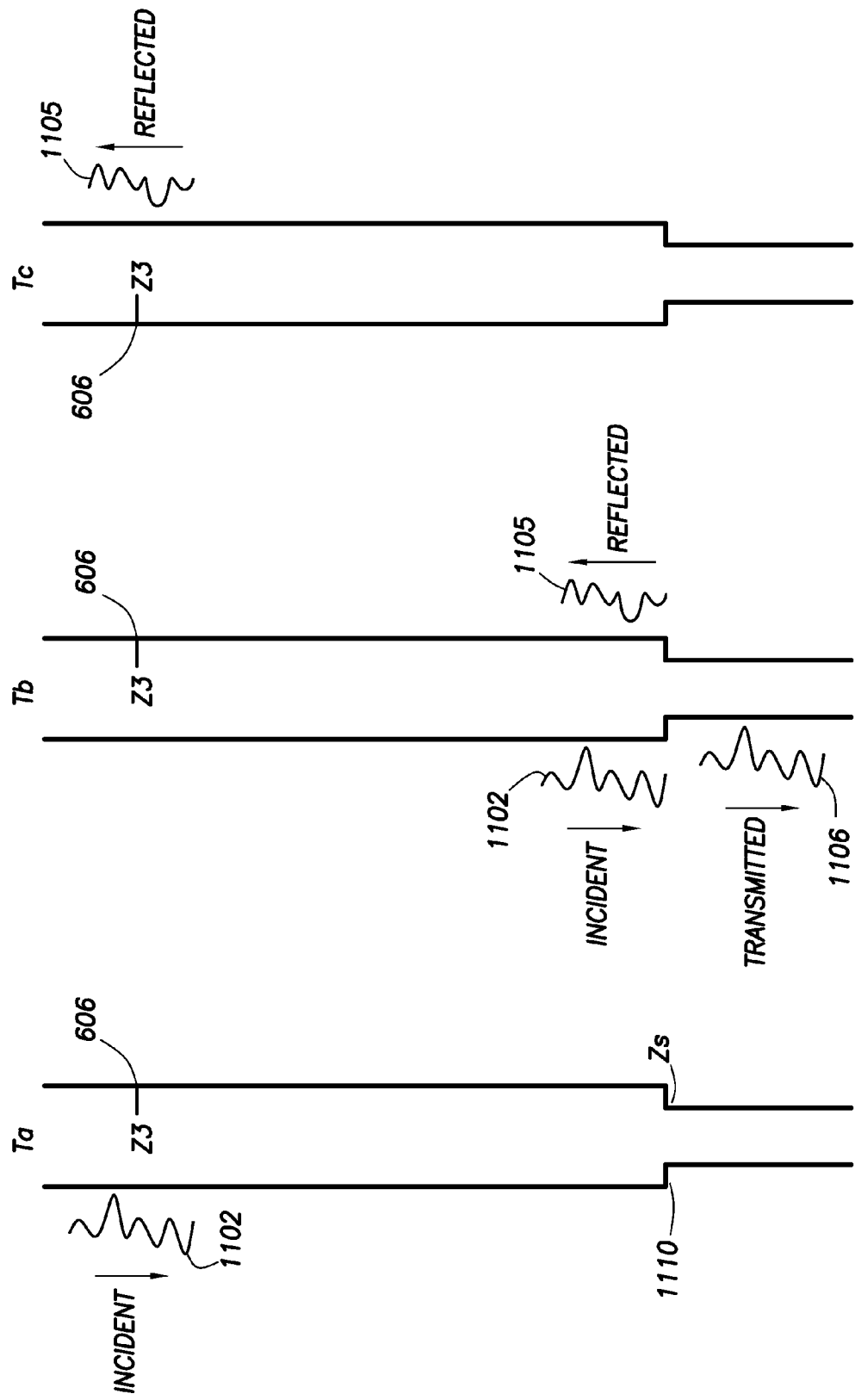
FIG. 11 depicts the reflection of downwardly propagating noise is reflected from a change in the interior cross-sectional area of drill pipe, resulting in upwardly propagating noise.

Referring to FIG. 6, the downwardly propagating mud pump noise 608 may be reflected from obstacles in the drill string 616 such as the mud pulser 618, the bit 620, or a change in the drill string's inner diameter. FIG. 11 illustrates incident mud pump noise 1102 reflecting from a change in drill pipe inner diameter 1110 located at depth Zs. For example, pressure transducer 606 is located at Z3 and it measures a downwardly propagating noise pulse at time Ta. At time Tb, the downwardly propagating noise pulse reaches the change in diameter 1110. Part of the noise pulse is transmitted 1106, and part is reflected 1105. The reflected, upwardly propagating noise waveform will be similar to the incident noise waveform, except that it may acquire a phase shift φ and will be reduced in amplitude by the factor A. At time Tc, the reflected noise pulse 1105 propagates upwardly past the pressure transducer 606, having acquired the time lag Tc−Ta. The reflected noise $N_U(t)$ is thus related to the downwardly propagating noise pulse at location 606 by $$N_U(t)=Ae^{i\phi} \cdot N_D(t+Tc-Ta),$$

where $N_D(t)$ has been determined as previously explained. The cross-correlation of $R3(t)$ and $N_D(t)$ can then be used to determine Tc−Ta, φ, and A as explained below. Since permanent obstacles in the drill string cause the reflection, these three quantities will remain constant with time and many measurements can be averaged for increased accuracy. Once these three quantities have been determined, an estimate of the upwardly propagating noise $N_U(t)$ may be obtained. Then $N_U(t)$ may be subtracted from $R3(t)$ to further improve the signal-to-noise ratio via $\tilde{R}3(t)=R3(t)-N_U(t)$. The same process can be applied to the other pressure transducers' signals to remove the reflected mud pump noise. The three signals now having been corrected for downwardly propagating and upwardly propagating mud pump noise can be time shifted and stacked for improved signal-to-noise, $\tilde{F}_U(t)=\{\tilde{R}1(t+(Z3-Z1)/V)+\tilde{R}2(t+(Z2-Z1)/V)+\tilde{R}3(t)\}/3$.

One example of the details of obtaining the three quantities, Tc−Ta, φ, and A is now described. Suppose that the true MWD mud pulse signal at pressure transducer 606 is $M3(t)$. After the downwardly propagating mud pump noise has been removed, the corrected signal at 606 can be written as $R3(t)=M3(t)+N_U(t)$, i.e. it is composed of the MWD mud pulse signal and the reflected mud pump noise. The downwardly propagating mud pump noise has been obtained. The cross-correlation function $C3D(d)$ between the corrected $R3(t)$ and the estimated $N_D(t)$ is $$C_{3D}(d) = \sum_{k=0}^{m-1} \{[R_3(tk) - \overline{R_3}] \cdot [N_D(tj) - \overline{N_D}]\}$$

where j=k+d and where $\overline{R3}$ and $\overline{N_D}$ are the mean values of $R3(t)$ and $N_D(t)$ calculated over the appropriate time windows. The cross-correlation function $C3D(d)$ is maximum when $d=(Tc-Ta)/\Delta t$. If the cross-correlation is calculated many times and the results averaged, then there should be no net correlation between the upwardly propagating noise, $N_D(t)$, and the MWD mud pulse signal, $M3(t)$. However, the downwardly propagating mud pump noise, $N_D(t)$, and the upwardly propagating mud pump noise, $N_U(t)$, will be correlated. The reflection parameters are given by $$A \cdot e^{j\phi} = \frac{\langle C_{3D}(d) \rangle}{(m-1)\langle \sigma_N^2 \rangle},$$

where $\langle \rangle$ denotes an average over many measurements. The standard deviation of the downwardly propagating mud pump noise, $\sigma_N$, is calculated using $$\sigma_N = \frac{1}{m-1}\sqrt{\sum_{k=0}^{m-1}(N_D(t_{i+k}) - \overline{N_D})^2}$$

where the time window corresponds to that which gives the maximum value for C3D(d).

Figure 12:
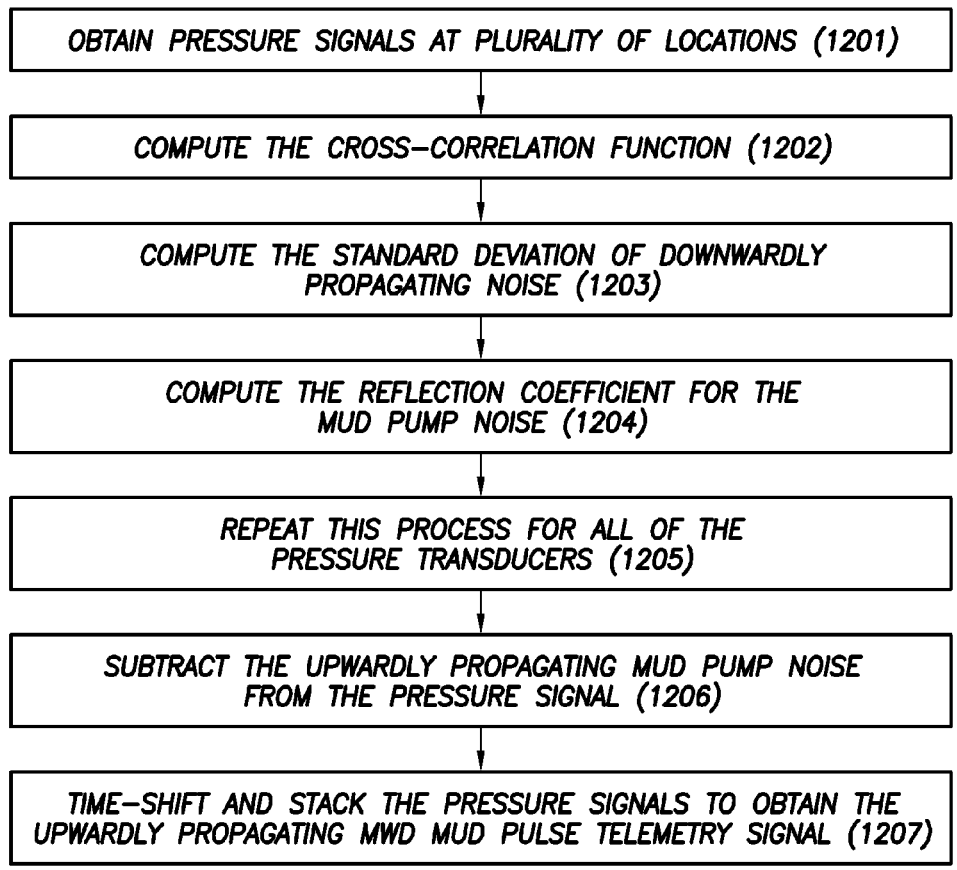
FIG. 12 is a flow chart describing the process for correcting the pressure transducer signals for upwardly propagating mud pump noise that has been reflected by an obstacle in the drill string below the pressure transducer.

FIG. 12 shows a method for removing reflected, upwardly propagating mud pump noise. The method may first include obtaining pressure signals from a plurality of locations, at 1201. In one example, the pressure signals may comprise raw pressure measurements from pressure sensors, such as pressure transducers. In another example, the pressure signals may comprise corrected pressure signals that have been corrected using one or more of the above described correction techniques. The source of the pressure signals is not intended to limit the invention.

The method may next include computing the cross-correlation function, at 1202. In one example, the cross-correlation function between the pressure signal and the previously computed downwardly propagating pump noise. Such a cross-correlation function may have the form $$C_{3D(d)} = \sum_{k=0}^{m-1}\{[R_3(tk) - \overline{R_3}] \cdot [N_D(tj) - \overline{N_D}]\}.$$

The maximum value for the cross-correlation function may enable the determination of the time between when the downwardly propagating noise signal passes the pressure sensor and when the reflected, upwardly propagating noise signal passes the pressure sensor (e.g., Tc–Ta). The computation of the cross-correlation function and its maximum may be performed many times and the results averaged.

Next, the method may include calculating the standard deviation of the downwardly propagating noise for the time window that corresponds to the maximum value for the cross-correlation function, at 1203. Next the method may include computing a reflection coefficient for the mud pump noise, at 1204). In one example, this is performed by averaging the equation $$A \cdot e^{j\phi} = \frac{\langle C_{3D}(d) \rangle}{(m-1)\langle \sigma_N^2 \rangle},$$

over many measurements.

Next, the method may include repeating the above process for the plurality of pressure transducers, at 1205. This step may be applied to a plurality of pressure measurements, when more than one pressure signal is obtained. In other examples, this step may be omitted.

The method may next include subtracting the upwardly propagating mud pump noise from the pressure signal, at (1206). In one example, the upwardly propagating mud pump noise may be subtracted from the pressure signal using the equation $\tilde{R}3(t) = R3(t) - Ae^{i\phi} \cdot N_D(t + Tc - Ta)$. In one example, the pressure signal is a corrected pressure signal that has been corrected using one or more of the techniques described herein.

Next, the method may include time-shifting and stacking the plurality of pressure signals to obtain the upwardly propagating MWD signal, at 1207. In one example, three corrected pressure signals may be used to time shift and stack the signals. In particular, the three signals may be time shifted and stacked using the equation $\tilde{F}_U(t) = \{\tilde{R}1(t+(Z3-Z1)/V) + \tilde{R}2(t+(Z2-Z1)/V) + \tilde{R}3(t)\}/3$. Those having ordinary skill in the art will be able to devise equations for time-shifting and stacking more or less than three pressure signals.

Figure 13:
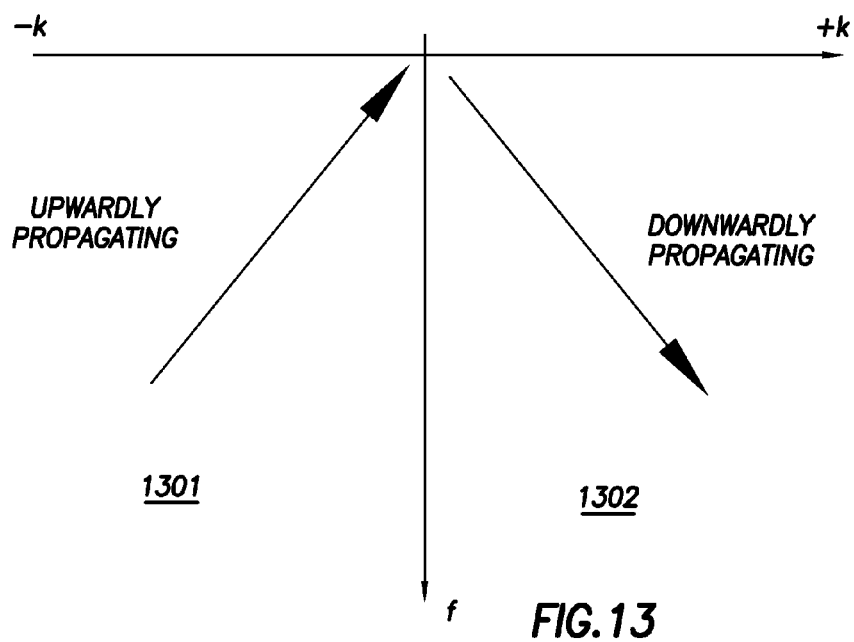
FIG. 13 is a representation of a two-dimensional data set in frequency-wavenumber space depicting the two-dimensional Fourier transform of data obtained in depth and time.

There are other algorithms for separating and removing downwardly propagating signals from upwardly propagating signals which can be applied to improve the MWD signal-to-noise ratio. For example, various mathematical techniques have been developed for Vertical Seismic Profiling (VSP) to separate and remove downwardly propagating seismic waves from reflected, upwardly propagating seismic waves. See for example, Chapter 5 in "Vertical Seismic Profiling, Volume 14A", by Bob Hardage, Geophysical Press, London 1985, and "Vertical Seismic Profiling, Volume 14B", by N. Toksov and R. Stewart, Geophysical Press, London 1984. One example is f-k velocity filtering, where seismic measurements are obtained at a number of specific depths versus time to provide a two-dimensional data set in depth and time, F(Z,t). FIGS. 8 and 9 illustrate a similar two-dimensional data set with coordinates in space and time for pressure transducers 602, 604 and 606. In f-k filtering, a two-dimensional Fourier transform is then applied to F(Z,t) to obtain a corresponding data set in frequency and wavenumber space or G(f,k). FIG. 13 illustrates the transformed data set in (f,k) space. Positive values of the wavenumber k correspond to downwardly propagating waves and are located in quadrant 1302. Negative values of the wavenumber k correspond to upwardly propagating waves and are located in quadrant 1301. In f-k filtering, data in quadrant 1302 are multiplied by a very small number (e.g. 0.001) to reduce the effects of downwardly propagating waves. The inverse Fourier transform is then applied to the modified G(f,k) data. Most of the downwardly propagating waves are thus removed from the final data set in (Z,t) space. If some frequencies f are associated with noise (e.g. mud pump noise), then G(f,k) points associated with these frequencies may also be multiplied by a small number before the inverse Fourier transform is applied. The corrected data in (Z,t) space can be time-shifted (for upwardly propagating signals) and averaged to enhance the MWD mud pulse signal.

Further vertical seismic profiling techniques such as, for example, removing multiples may be used to enhance the upwardly propagating signal 904. Multiples refer to multiple reflections between two or more obstacles. For example, an upwardly propagating MWD pulse signal may reflect from a change in drill string's inner diameter and result in a downwardly propagating signal. This in turn may reflect from the MWD pulser and produce a second, time-delayed upwardly propagating signal or ghost. Similarly, multiple reflections of the noise can result in noise multiples. To eliminate or reduce such multiples, a relatively or substantially constant diameter within the drill string may be used. In other words, the various drill pipe sections and subs may be configured to provide such a substantially constant inner diameter.

Figure 14:
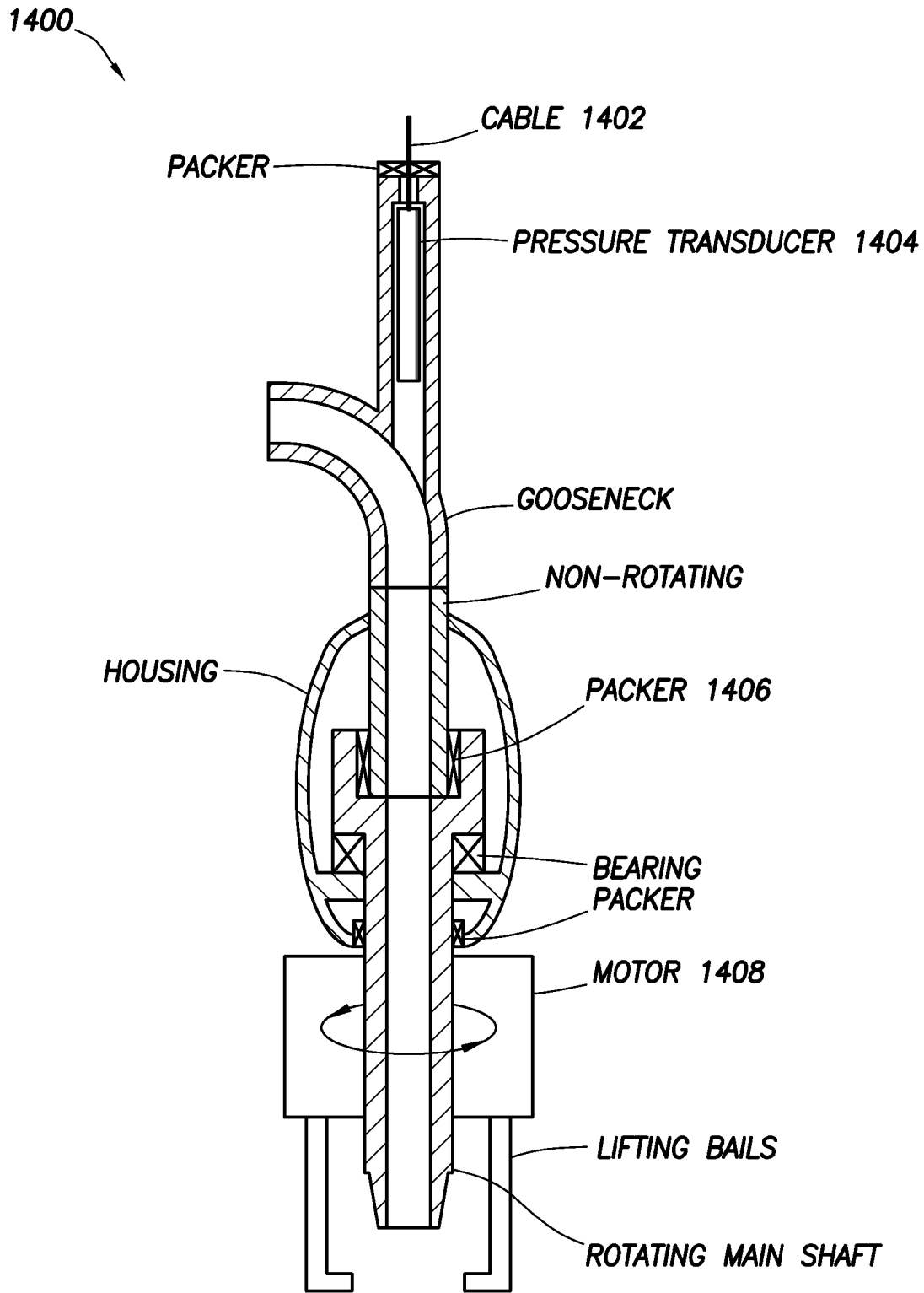
FIG. 14 is a cross-sectional view of another example manner in which one or more pressure transducers may be disposed within a drill string.

FIG. 14 is a cross-sectional view of another example manner in which one or more pressure transducers may be disposed within a drill string. The example of FIG. 14 is implemented using a top drive system 1400 in conjunction with a wireline cable 1402 instead of wired drill pipe to deploy a pressure transducer 1404 inside the drill pipe. The pressure transducer 1404 may be lowered via the wireline cable 1402 into the drill pipe a distance that locates the pressure transducer 1404 a quarter wavelength from the transducer in the standpipe (not shown). In operation, the wireline cable 1402 passes through a packer 1406 located above a top drive unit 1408. When adding a new stand of drill pipe, the cable 1402 and pressure transducer 1404 are retracted above the top drive system 1400. Then, when the new stand of drill pipe is in place, the pressure transducer 1404 is lowered into the drill pipe.

The wireline cable 1402 and the pressure transducer 1404 may be lowered a couple or few hundred meters into the drill pipe, thereby enabling a relatively small winch to be used and enabling the cable 1402 and the pressure transducer 1404 to be lowered or retracted relatively quickly.

While the example of FIG. 14 depicts the use of a single pressure transducer, multiple pressure transducers or sensors may also be deployed into a drill pipe using a wireline packer configuration similar to that shown in FIG. 14. In particular, an array of miniature pressure transducers such as, for example, fiber optic pressure transducers mounted in a fiber optic cable may be sized to pass through a wireline packer and into a drill string.

The invention can be applied to other methods of drilling where mud pulse telemetry is employed. In casing drilling, casing is used instead of drill pipe to transmit fluids and mechanical forces between the rig and the drill bit. The MWD system can be removed afterwards while the casing remains and is cemented in the borehole. Pressure transducers deployed inside casing using wireline cable or fiber-optic cable can be used to increase the signal to noise ratio of the mud pulse telemetry system. In coiled tubing drilling (CTD), a continuous metal tubular is initially coiled on a drum and spooled out as the well is drilled. The invention can be applied to CTD by deploying wireline or fiber-optic pressure transducers in the upper portion of the tubing.

In offshore drilling, risers are often used to return the drilling mud and cuttings to the rig. Risers consist of tubular components that surround the drill pipe and are attached to the blow-out preventor (BOP) on the seabed and connect to the rig. An array of pressure transducers may be mounted on the riser, rather than being located inside the drill pipe or attached to the drill pipe. These pressure transducers transmit data to the rig via hardwired connections, or by wireless means such as electromagnetic or acoustic waves. They may be powered by batteries or from the surface. These pressure transducers measure the pressure in the annulus between the drill pipe and the riser. The downwardly propagating noise and the upwardly propagating MWD mud pulse signals may also be present in this annular gap between the drill pipe and the riser.

Thus, as set forth above in connection with the description of the examples in FIGS. 6-14, the deployment of one or more pressure transducers within a drill string may be used to enhance drill string telemetry signals. In particular, the one or more pressure transducers may be used to substantially reduce the effects of downwardly propagating noise signals (e.g., mud pump noise and/or other rig noise) on upwardly propagating telemetry signals (e.g., MWD signals). In one implementation, one or more pressure transducers disposed along a wired drill pipe portion of a drill string form a pressure sensor array. The pressure transducers may be spaced apart a distance that facilitates the use of an adaptive filtering technique. For example, the pressure transducers may be spaced about a quarter wavelength (i.e., a quarter wavelength of upwardly propagating MWD signals) apart to enable or facilitate the use of a velocity filtering or vertical seismic profiling technique. In addition, the pressure transducers may be spaced at other distances, such as half of a wavelength, three-quarters of a wavelength, and multiples thereof, or another distance that is selected based on two or more telemetry frequencies that are planned to be used. As described above, such a velocity-based profiling technique can be used to estimate downwardly propagating noise (e.g., from a mud pump), which can then be used to correct (e.g., via subtraction) the pressure signals received from the pressure sensors. The corrected pressure sensor signals can then be time-shifted and stacked (e.g., averaged) to provide, for example, an enhanced (e.g., increased signal-to-noise ratio) upwardly propagating MWD signal. In addition, mud pump noise and other rig noise that are reflected from obstacles and propagate upward can also be detected and substantially removed.

Thus, in the example drill string telemetry systems described herein that use, for example, both mud pulse telemetry and wired drill pipe to enable communications between the MWD tools and surface equipment, the noise cancellation systems and techniques described herein in connection with FIGS. 6-14 may be used to improve (i.e., increase) the signal-to-noise ratio of the upwardly propagating telemetry signals. An improved or increased signal-to-noise ratio for the upwardly propagating telemetry signals enables an increased data rate for mud-based drill string telemetry systems and/or may enable the useful depth of a mud-based drill string telemetry system to be increased.

Further, in systems employing wired drill pipe and mud pulse telemetry, failure of the wired drill pipe below the pressure transducers nevertheless enables the wired drill pipe to be used as a communication medium for the pressure transducers which, in turn, can be used in the foregoing manners to improve communications via the mud pulse telemetry system. Still further, the noise reduction, suppression, or cancellation systems and techniques described in connection with FIGS. 6-14 may be particularly useful to achieve high drill string telemetry communication rates without having to use wired drill pipe along the entire length of the drill string. In other words, a mud pulse telemetry system can be used and its data rate can be increased when used in conjunction with the noise cancellation techniques and systems described herein in connection with FIGS. 6-14. Specifically, only an upper portion of the drill string including one or more pressure transducers needs to be composed of wired drill pipe to enable the pressure transducers to communicate with surface equipment. Such a configuration may be particularly advantageous when used in, for example, deepwater wells.

While the invention has been described as detecting and substantially removing downwardly propagating noise to improve the signal to noise ratio of upwardly propagating signal, the same approach can be applied to improve the signal to noise ratio of a downwardly propagating signal. For example, it is sometimes necessary to transmit a signal from the surface to the MWD system. Such downlink transmissions are used to change the data acquisition mode of the MWD system, or to change the direction of a steerable drilling system. The downlink can be performed by generating pressure pulses at the surface that are detected by the MWD system. An array of pressure transducers can be distributed among various MWD tools, and the signals processed in a similar manner as described for the uplink transmissions. In the case of a downlink, the downhole noise source may be the MWD mud pulse telemetry. Velocity filtering can be applied to estimate and remove the mud pulse signal and to enhance the signal sent from the surface. The processing could be done in the MWD system.

It will be understood from the foregoing description that the example systems and methods described herein may be modified from the specific embodiments provided. For example, the communication links described herein may be wired or wireless. The pressure measured at the sub 700 may be transmitted to the surface as digital or analog information. The example devices described herein may be manually and/or automatically activated or operated to perform the desired operations. Such activation may be performed as desired and/or based on data generated, conditions detected, and/or results from downhole operations. Other algorithms which separate upwardly propagating and downwardly propagating waves are also envisioned in the invention. For example, the velocity has been treated as a constant, independent of frequency. However, it is possible to modify the algorithm to include situations where the velocity is a function of frequency. The final processing has been described as being performed in a surface computer; however, it may be implemented in downhole sub 700 and the processed results sent to the surface.

The foregoing description and example systems and methods provided thereby are for purposes of illustration only and are not to be construed as limiting. Thus, although certain apparatus and methods have been described herein, the scope of coverage of this patent is not limited thereto. To the contrary, this patent covers all embodiments fairly falling within the scope of the appended claims either literally or under the doctrine of equivalents.

What is claimed is:

1. A wellbore telemetry system, comprising:
   a drill string in a wellbore having a portion of wired drill pipe that carries a data communication link and supplies fluid under pressure during drilling of the wellbore and a portion of non-wired drill pipe that supplies fluid under pressure during drilling of the wellbore, and a sub coupling the wired drill pipe and the non-wired drill pipe, the sub comprising at least a pressure sensor;
   a drilling assembly at a bottom end of the non-wired drill pipe, the drilling assembly carrying a plurality of tools;
   a downhole pulser in the drilling assembly that is configured to send data to the sub or to the surface by producing pressure pulses in the fluid;
   a first data transmission device that transmits data received at the pressure sensor from the downhole pulser to the surface via the data communication link in the wired drill pipe.

2. A drilling assembly for use during drilling of a wellbore, comprising:
   a drill string in a wellbore having a portion of wired drill pipe that carries a data communication link and supplies fluid under pressure during drilling of the wellbore and a portion of non-wired drill pipe that supplies fluid under pressure during drilling of the wellbore, and a sub coupling the wired drill pipe and the non-wired drill pipe, the sub comprising at least a pressure sensor;
   a data connection connected to the data communication link carried by the wired drill pipe;
   a plurality of tools in the drilling assembly, wherein each tool provides data to be transmitted to a surface location during drilling of the wellbore;
   a downhole pulser among the plurality of tools that is configured to produce pressure pulses in the fluid in the non-wired drill pipe during drilling of the wellbore, the pressure pulses representative of the data received from each tool in the plurality of tools;
   a pressure sensor positioned at a downhole location, coupled to the data connection;
   a first data transmission device that transmits data received at the pressure sensor at the downhole location during drilling of the wellbore to the data communication link; and
   a processing means configured to process and transmit data received at the pressure sensor from the downhole pulser to the surface via the data communication link in the wired drill pipe.

3. The drilling assembly according to claim 2, wherein the processing means is configured to apply a noise cancellation technique at a downhole location in the wellbore located at least a threshold depth apart from a surface source of noise.

* * * * *